United States Patent
Tanaka

(10) Patent No.: US 8,270,040 B2
(45) Date of Patent: Sep. 18, 2012

(54) IMAGE-ENCODING APPARATUS AND METHOD OUTPUTTING CONTROL PARAMETER FOR CONTROLLING STRUCTURE OF MOVING IMAGE DATA ENCODED GROUP IN ENCODING UNIT BASED ON INDEX VALUE

(75) Inventor: Eiichi Tanaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1588 days.

(21) Appl. No.: 11/299,521

(22) Filed: Dec. 12, 2005

(65) Prior Publication Data

US 2006/0126735 A1  Jun. 15, 2006

(30) Foreign Application Priority Data

Dec. 13, 2004  (JP) ................. 2004-360284
Dec. 13, 2004  (JP) ................. 2004-360285
Nov. 15, 2005  (JP) ................. 2005-330595

(51) Int. Cl.
*H04N 1/00* (2006.01)

(52) U.S. Cl. ............ 358/426.02; 358/426.01; 358/400; 375/240.01; 375/240.29; 375/240.12

(58) Field of Classification Search ............ 375/240.12, 375/240.01, 240.29; 358/426.02, 426.01, 358/400

See application file for complete search history.

(56) References Cited

U.S. PATENT DOCUMENTS

| | | | | |
|---|---|---|---|---|
| 5,694,171 A | * | 12/1997 | Katto | 375/240.03 |
| 2002/0048389 A1 | * | 4/2002 | Komaki | 382/107 |
| 2002/0172282 A1 | * | 11/2002 | Kato | 375/240.13 |
| 2005/0084009 A1 | * | 4/2005 | Furukawa et al. | 375/240.03 |

FOREIGN PATENT DOCUMENTS

| | | |
|---|---|---|
| JP | 2003-219416 A | 7/2003 |
| JP | 2004-180345 A | 6/2004 |

OTHER PUBLICATIONS

Yatabe et al., Video Camera Device, Jul. 31, 2003, JP-2003219416.*

* cited by examiner

*Primary Examiner* — Benny Q Tieu
*Assistant Examiner* — Martin Mushambo
(74) *Attorney, Agent, or Firm* — Canon USA Inc. IP Division

(57) ABSTRACT

An image-encoding apparatus includes an encoding unit that performs intra-frame encoding or inter-frame encoding on each picture of moving image data to output encoded data that includes an encoded group that includes at least one encoded picture, an encoding distortion calculating unit that calculates an amount of encoding distortion, an inter-frame correlation calculating unit that calculates a correlation between frames in the moving image data, an index value calculating unit that calculates an index value that is used to determine a structure of the encoded group based on the correlation, condition data, and the amount of encoding distortion, and an encoding control unit that outputs a control parameter for controlling at least the structure of the encoded group in the encoding unit based on the index value.

10 Claims, 20 Drawing Sheets

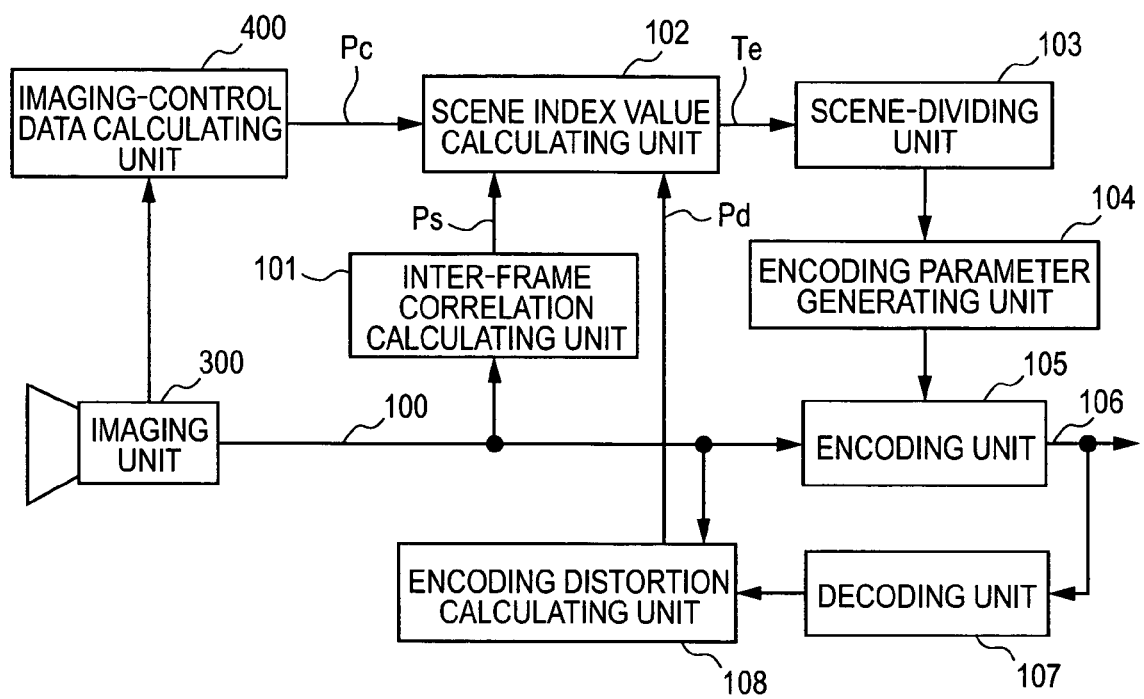

IMAGE-ENCODING APPARATUS AND METHOD OUTPUTTING CONTROL PARAMETER FOR CONTROLLING STRUCTURE OF MOVING IMAGE DATA ENCODED GROUP IN ENCODING UNIT BASED ON INDEX VALUE

BACKGROUND OF THE INVENTION

1. Field of the Invention

The present invention relates to an image-encoding apparatus, an image-encoding method, and a program for encoding moving images that are captured by an imaging unit on the basis of control parameters of the imaging unit.

2. Description of the Related Art

A method is known, in which the amount of code is controlled for each group of pictures (hereinafter referred to as GOP) when captured moving images are encoded. A GOP includes an intra-frame encoded picture (hereinafter referred to as an I picture) within which encoding is performed, an inter-frame encoded picture obtained by forward prediction (hereinafter referred to as a P picture) in which encoding is performed on the basis of the difference between a present picture and a preceding picture, and an inter-frame encoded picture obtained by bidirectional prediction (hereinafter referred to as a B picture) in which encoding is performed on the basis of the difference between a present picture and a preceding picture and the difference between the present picture and an upcoming picture. Generally, in a GOP, the I picture is the leading picture, and the P and B pictures follow the I picture.

From the viewpoint of encoding, the B picture is most efficient, and then the P picture and then the I picture. However, since the B and P pictures are encoded on the basis of differences between frames, the B and P pictures cannot be decoded by themselves. Moreover, when the correlation between frames is high, the B and P pictures are efficient from the viewpoint of encoding. In contrast, when the correlation is low, the B and P pictures are disadvantageously inefficient. Thus, problems exist, such that the amount of code of each of the B and P pictures heavily depends on the structure of moving images and the image quality may be deteriorated in spite of the original intention by excessively increasing a quantization value in order to cause the amount of code to fall within a predetermined range.

A method that is referred to as variable bit rate control is known, in which the amount of code allocated to each GOP is variable and the quantization value is kept constant as much as possible in order to avoid a deterioration in the image quality. However, the total amount of code varies according to time spent for shooting images. Thus, it is difficult to adjust the total amount of code to an expected total amount of code. Another method that is referred to as two-pass encoding is generally known, in which encoding is first performed with the quantization value of an entire moving image being constant in order to keep the total amount of code constant and then encoding is again performed while the target amount of code of each GOP or each picture is changed according to a change in the amount of generated code. However, this method is not effective for a system that requires real-time processing, such as a digital moving image camera. Thus, a method is provided, in which parallel encoding is performed with more than one encoding unit to achieve real-time processing in two-pass encoding. However, a substantial increase in the size of a circuit cannot be avoided.

A video camera apparatus that addresses the problems described above is disclosed in, for example, Japanese Patent Laid-Open No. 2003-219416, in which the state of an imaging unit is monitored on the basis of control parameters of the imaging unit, and a satisfactory image quality can be achieved by increasing the quantization value even without two-pass encoding in a condition (hereinafter referred to as an unsteady condition) in which control operation is performed so that the state of the imaging unit is changed.

In the video camera apparatus disclosed in Japanese Patent Laid-Open No. 2003-219416, the amount of code can be controlled according to the condition of the imaging unit. However, when the imaging unit is in an unsteady condition in which, for example, the imaging unit is performing zoom operation, performing automatic focus operation, operating an automatic iris, or performing automatic white balance adjustment, the difference between a present image and a reference image is inevitably large. That is to say, in the video camera apparatus described above in which the quantization value is manipulated without consideration of the correlation between frames, when the imaging unit is in an unsteady condition, the quantization value must be set to a large value in order to suppress an increase in the amount of code generated by encoding in each picture. As a result, a problem occurs, such that the image quality significantly deteriorates in an unsteady condition.

SUMMARY OF THE INVENTION

In view of the aforementioned problems, the present invention provides an image-encoding apparatus, an image-encoding method, and a program that can efficiently perform bit rate control by controlling the structure of a GOP on the basis of a control parameter of an imaging unit.

According to an aspect of the present invention, an image-encoding apparatus, to which moving image data and condition data, which is data related to a shooting condition of the moving image data, are input, includes an encoding unit that performs intra-frame encoding or inter-frame encoding on each picture of the moving image data to output encoded data that includes an encoded group that includes at least one encoded picture, an encoding distortion calculating unit that calculates an amount of encoding distortion that occurs in an encoding process performed by the encoding unit, an inter-frame correlation calculating unit that calculates a correlation between frames in the moving image data, an index value calculating unit that calculates an index value that is used to determine a structure of the encoded group based on the correlation output from the inter-frame correlation calculating unit, the condition data, and the amount of encoding distortion calculated by the encoding distortion calculating unit, and an encoding control unit that outputs a control parameter for controlling at least the structure of the encoded group in the encoding unit based on the index value output from the index value calculating unit.

According to another aspect of the present invention, an image-encoding method that uses an image-encoding apparatus to which moving image data and condition data, which is data related to a shooting condition of the moving image data, are input, the image-encoding apparatus including an encoding unit that performs intra-frame encoding or inter-frame encoding on each picture of the moving image data to output encoded data that includes an encoded group that includes at least one encoded picture includes an encoding distortion calculating step of calculating an amount of encoding distortion that occurs in an encoding process performed by the encoding unit, an inter-frame correlation calculating step of calculating a correlation between frames in the moving image data, an index value calculating step of calculating an index value that is used to determine a structure of the encoded group based on the correlation output from the inter-frame correlation calculating step, the condition data, and the amount of encoding distortion calculated in the encoding distortion calculating step, and an encoding control step of outputting a control parameter for controlling at least the structure of the encoded group in the encoding unit based on the index value output from the index value calculating step.

According to yet another aspect of the present invention, an image-encoding apparatus includes a moving image data input unit for inputting moving image data that is captured by an imaging unit, an imaging-unit control data input unit for inputting control data for controlling the imaging unit; an encoding unit that performs intra-frame encoding or inter-frame encoding on each picture of the moving image data to output encoded data that includes an encoded group that includes at least one encoded picture, and an encoding control unit that outputs a control parameter for controlling at least a structure of the encoded group in the encoding unit based on the control data, which is input in the imaging-unit control data input unit.

According to still another aspect of the present invention, an image-encoding method includes a moving image data input step of inputting moving image data that is captured by an imaging unit, an imaging-unit control data input step of inputting control data for controlling the imaging unit, an encoding step of performing intra-frame encoding or inter-frame encoding on each picture of the moving image data to output encoded data that includes an encoded group that includes at least one encoded picture, and an encoding control step of outputting a control parameter for controlling at least a structure of the encoded group in the encoding step based on the control data, which is input in the imaging-unit control data input step.

Further features of the present invention will become apparent from the following description of exemplary embodiments with reference to the attached drawings.

BRIEF DESCRIPTION OF THE DRAWINGS

FIG. 4 shows the structure of an exemplary image-encoding apparatus according to a third exemplary embodiment.

FIG. 5 shows exemplary level classification of types of the analyzed unsteady condition of an imaging unit.

DESCRIPTION OF THE EMBODIMENTS

Exemplary embodiments according to the present invention will now be described with reference to the drawings.

First Exemplary Embodiment

Figure 1:
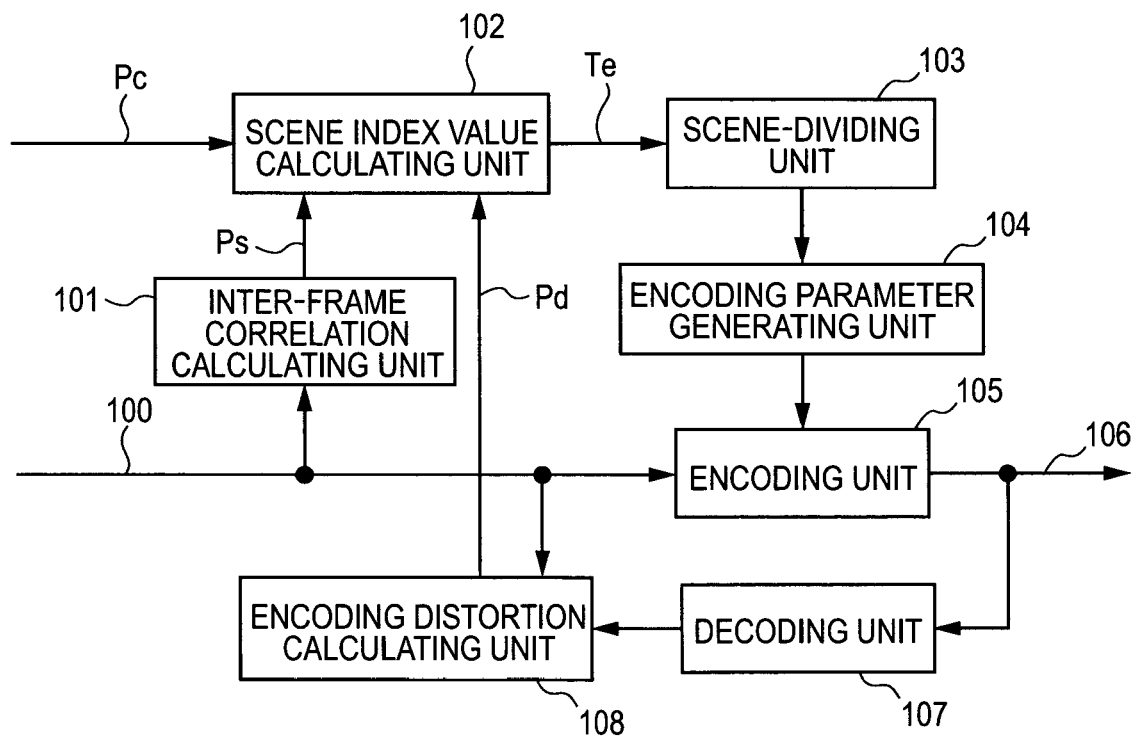
FIG. 1 shows the structure of an exemplary image-encoding apparatus according to a first exemplary embodiment.

FIG. 1 shows the structure of an exemplary image-encoding apparatus according to a first exemplary embodiment of the present invention. The image-encoding apparatus according to this exemplary embodiment performs encoding according to the Motion Picture Experts Group 2 (MPEG-2) format on non-compressed moving image data (digital image data) that is an input image.

In FIG. 1, a camera parameter Pc indicates the state of an input image 100 that is input to the image-encoding apparatus and is a parameter of a video camera in a case where the input image 100 is a moving image that is captured by the video camera. An inter-frame correlation Ps, an encoding distortion amount Pd, and a scene index value Te indicate an inter-frame correlation, the amount of encoding distortion, and a scene index value, respectively.

The image-encoding apparatus includes an inter-frame correlation calculating unit 101, a scene index value calculating unit 102, a scene-dividing unit 103, an encoding parameter generating unit 104, an encoding unit 105, a decoding unit 107, and an encoding distortion calculating unit 108.

The inter-frame correlation calculating unit 101 calculates and outputs the inter-frame correlation Ps between the input image 100 to be processed and a preceding image. The scene index value calculating unit 102 calculates a scene index value Te of the current image on the basis of the camera parameter Pc, the inter-frame correlation Ps, and the encoding distortion amount Pd. The scene-dividing unit 103 receives the scene index value Te output from the scene index value calculating unit 102 and outputs a scene division instruction (a GOP division instruction). The encoding parameter generating unit 104 receives the scene division instruction from the scene-dividing unit 103 and generates parameters for generating a new GOP (an encoding group). The encoding unit 105 encodes the input image 100, according to the encoding parameters generated by the encoding parameter generating unit 104, and outputs an encoded stream 106. The decoding unit 107 decodes the encoded stream 106 output from the encoding unit 105 and outputs a decoded image. The encoding distortion calculating unit 108 outputs the difference between the input image 100 and the decoded image output from the decoding unit 107 as the encoding distortion amount Pd.

The operation of the image-encoding apparatus according to the first exemplary embodiment will now be described with reference to FIGS. 1 and 2.

The inter-frame correlation calculating unit 101 includes a frame memory therein and compares the input image 100 with a preceding input image (a preceding frame image) stored in the frame memory to output the inter-frame correlation Ps between these two images. In this exemplary embodiment, the inter-frame correlation calculating unit 101 is provided outside the encoding unit 105. Alternatively, the inter-frame correlation calculating unit 101 may be provided within the encoding unit 105 in a case where a degree of correlation is used, the degree of correlation being obtained when a search is performed for motion vector within the encoding unit 105.

The scene index value calculating unit 102 receives the camera parameter Pc, which indicates the state of the input image 100, the inter-frame correlation Ps, and the encoding distortion amount Pd output from the encoding distortion calculating unit 108 and calculates the scene index value Te according to the following expression (1):

$$Te = \alpha \times Pc + \beta \times Ps + \gamma \times Pd \quad (1)$$

where $\alpha$ is a weighting coefficient for the camera parameter Pc, $\beta$ is a weighting coefficient for the inter-frame correlation Ps, and $\gamma$ is a weighting coefficient for the encoding distortion amount Pd; These coefficients are given in the scene index value calculating unit 102.

The scene index value calculating unit 102 adjusts weights of the camera parameter Pc, the inter-frame correlation Ps, and the encoding distortion amount Pd with the weighting coefficients $\alpha$, $\beta$, and $\gamma$ and calculates the scene index value Te. The scene-dividing unit 103 compares the scene index value Te calculated by the scene index value calculating unit 102 with a threshold value Tth that is held by the scene-dividing unit 103 to determine whether scene division is to be performed. When the scene index value Te exceeds the threshold value Tth, the scene-dividing unit 103 determines that scene division is to be performed and outputs an instruction for generating a new GOP to the encoding parameter generating unit 104. When the scene index value Te is less than the threshold value Tth, the scene-dividing unit 103 determines that scene division is not to be performed and does not output an instruction for generating a new GOP.

Figure 2:
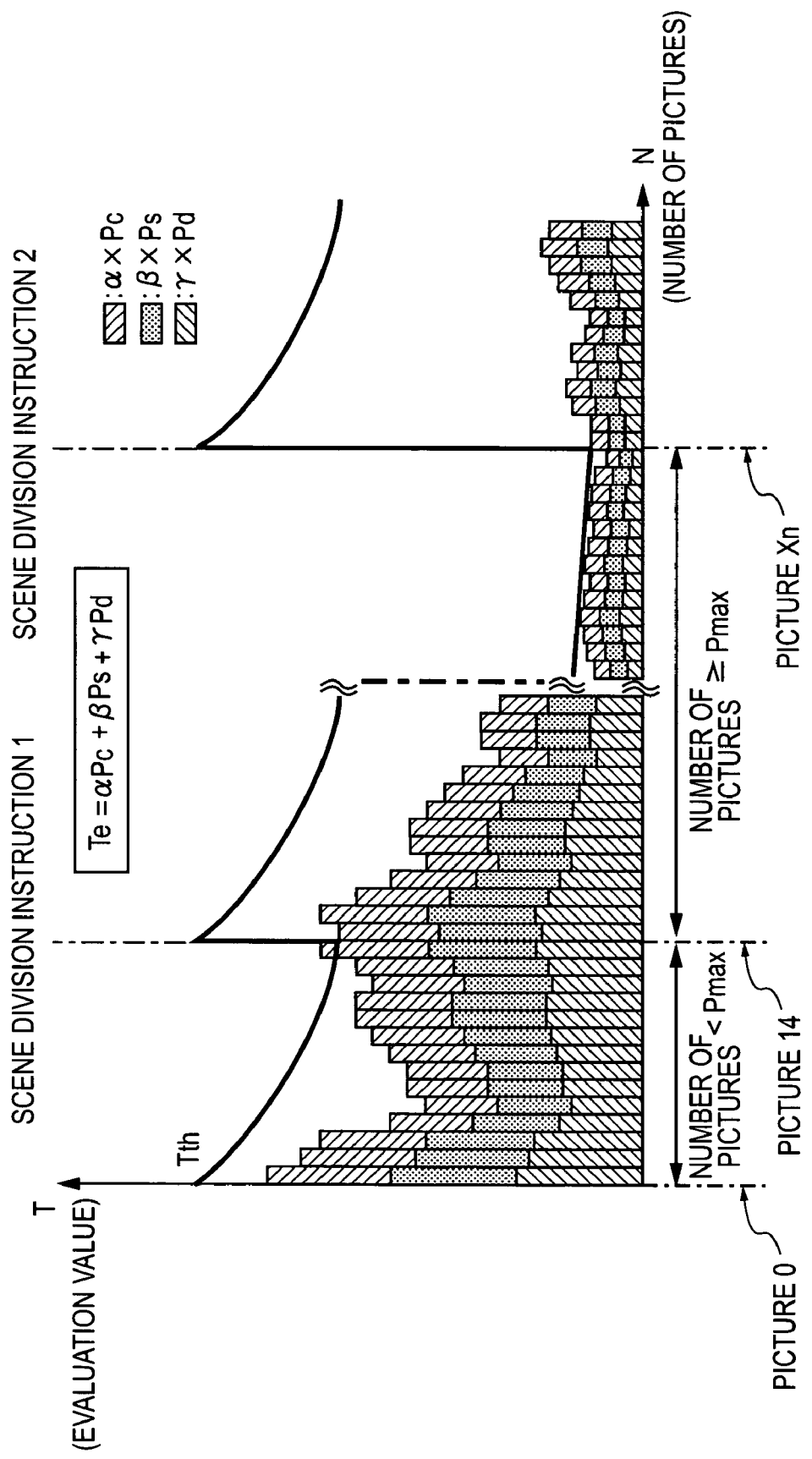
FIG. 2 shows the relationship between a threshold value Tth for a scene-dividing unit and a scene index value Te.

FIG. 2 shows the relationship between the threshold value Tth and the scene index value Te. In a graph of FIG. 2, the ordinate T and abscissa N indicate the scene index value Te and the number of pictures, respectively. The scene-dividing unit 103 calculates the scene index value Te by adding $\alpha \times Pc$, $\beta \times Ps$, and $\gamma \times Pd$, as shown by expression (1). When the scene-dividing unit 103 determines that the scene index value Te exceeds the threshold value Tth, the encoding parameter generating unit 104 generates a new GOP.

A case where the threshold value Tth is a fixed value will now be considered. When the threshold value Tth is low, a new GOP is frequently generated. When the threshold value Tth is excessively high, an instruction for generating a new GOP is not issued even in a case where scene division should be performed. When the structure of a GOP is frequently changed, control process of the amount of code becomes complicated, resulting in a deterioration in the image quality. On the other hand, when a GOP is long, encoding distortion is accumulated, resulting in a deterioration in the image quality.

Accordingly, in this exemplary embodiment, the threshold value Tth is set high at the beginning of a GOP, and is set lower as time elapses. In this way, just after a new GOP is generated when the scene index value Te exceeds the threshold value Tth, another new GOP can be prevented from being generated when the scene index value Te exceeds the threshold value Tth again. When a new GOP is generated, the threshold value Tth is set to a high initial value. Since the threshold value Tth gradually decreases from the initial value when a GOP starts, as shown by a Tth curve in FIG. 2, the threshold value Tth is set high until a predetermined time elapses after the GOP is generated. Thus, a scene division instruction is less likely to be issued, and the image quality can be stabilized.

Exemplary operation of the scene-dividing unit 103 will now be described with reference to FIG. 2. It is assumed that the start point of a new GOP is a picture 0. Since the scene index value Te is less than the threshold value Tth at this point, the scene-dividing unit 103 does not issue a scene division instruction. Similarly, since the scene index value Te is less than the threshold value Tth during the period between pictures 0 and 14, including picture 14, the scene-dividing unit 103 does not issue a scene division instruction.

When the scene index value Te exceeds the threshold value Tth at the picture 14, as shown in FIG. 2, the scene-dividing unit 103 outputs a scene division instruction 1 to the encoding parameter generating unit 104 and resets the threshold value Tth to the initial value (the value at the picture 0). As described above, the scene-dividing unit 103 sets the threshold value Tth to a high value (the initial value) after a new GOP is generated. Thus, the scene index value Te is less than the threshold value Tth again at a picture following the picture 14, and another new GOP can be prevented from being generated.

Although the scene index value Te at the picture 14 is smaller than the scene index value Te at the picture 0, the threshold value Tth gradually decreases from the start point of a GOP, as shown in FIG. 2. Thus, the scene index value Te at the picture 14 exceeds the threshold value Tth. In this way, in FIG. 2, the Tth curve is set so that the threshold value Tth gradually decreases as the length of a GOP increases. The behavior of a change in the threshold value Tth is not limited to that corresponding to the Tth curve but, for example, may take a simplified form in which the threshold value Tth decreases in a staircase pattern as a predetermined number of pictures advance.

Moreover, the maximum number Pmax of pictures that constitute a GOP is predetermined. In a case where the number of pictures reaches the maximum number Pmax, even when the scene index value Te does not exceed the threshold value Tth, the scene-dividing unit 103 forcibly issues a scene division instruction to generate a new GOP. In contrast, when the maximum number Pmax is not specified, the encoding unit 105 cannot determine the number of pictures included in a GOP. Thus, it is difficult to control the amount of code. That is to say, the structure of a GOP can be updated within a predetermined period by setting the maximum number Pmax, and the amount of code can be controlled with consideration of the maximum number Pmax.

In the case shown in FIG. 2, even though the scene index value Te does not exceed the threshold value Tth at a picture Xn, the scene-dividing unit 103 determines that the number of pictures during the period between pictures 15 and Xn, including pictures 15 and Xn, is equal to the maximum number Pmax and issues a scene division instruction 2. Then, the scene-dividing unit 103 resets the threshold value Tth to the initial value at a picture following the picture Xn to prevent new GOPs from being continuously generated. The count of the number of pictures is reset every time an instruction for generating a new GOP is issued. Thus, the count of the number of pictures reaches the maximum number Pmax for the next time at the (Xn+Pmax)th picture. Any method can be used to determine the threshold value Tth and the maximum number Pmax and will not be described here.

The encoding parameter generating unit 104 generates encoding parameters that constitute a new GOP according to the scene division instruction output from the scene-dividing unit 103. The encoding unit 105 receives the encoding parameters generated by the encoding parameter generating unit 104, and encodes the input image 100 and outputs the processed image as the encoded stream 106. The decoding unit 107 receives the encoded stream 106 and generates a decoded image. The encoding distortion calculating unit 108 includes a frame memory therein, compares the decoded image with the input image 100 stored in the frame memory, which is not encoded, to calculate the encoding distortion amount Pd generated by encoding, and outputs the calculated encoding distortion amount Pd to the scene index value calculating unit 102. A method for generating a parameter according to the scene division instruction will not be described here.

As described above, in the image-encoding apparatus according to the first exemplary embodiment, control operation is performed on the basis of the inter-frame correlation Ps and the encoding distortion amount Pd, these two parameters being data for encoding an image, and the camera parameter Pc so that an optimum GOP structure can be obtained. Thus, the correlation within each GOP can be high, and the amount of code can be efficiently controlled.

Second Exemplary Embodiment

An image-encoding apparatus according to a second exemplary embodiment of the present invention will now be described. The same reference numerals assigned to components of the image-encoding apparatus shown in FIG. 1 according to the first exemplary embodiment are assigned to corresponding components of the image-encoding apparatus according to the second exemplary embodiment. The distinction between the image-encoding apparatus according to the first exemplary embodiment and the image-encoding apparatus according to the second exemplary embodiment will mainly be described.

Figure 3:
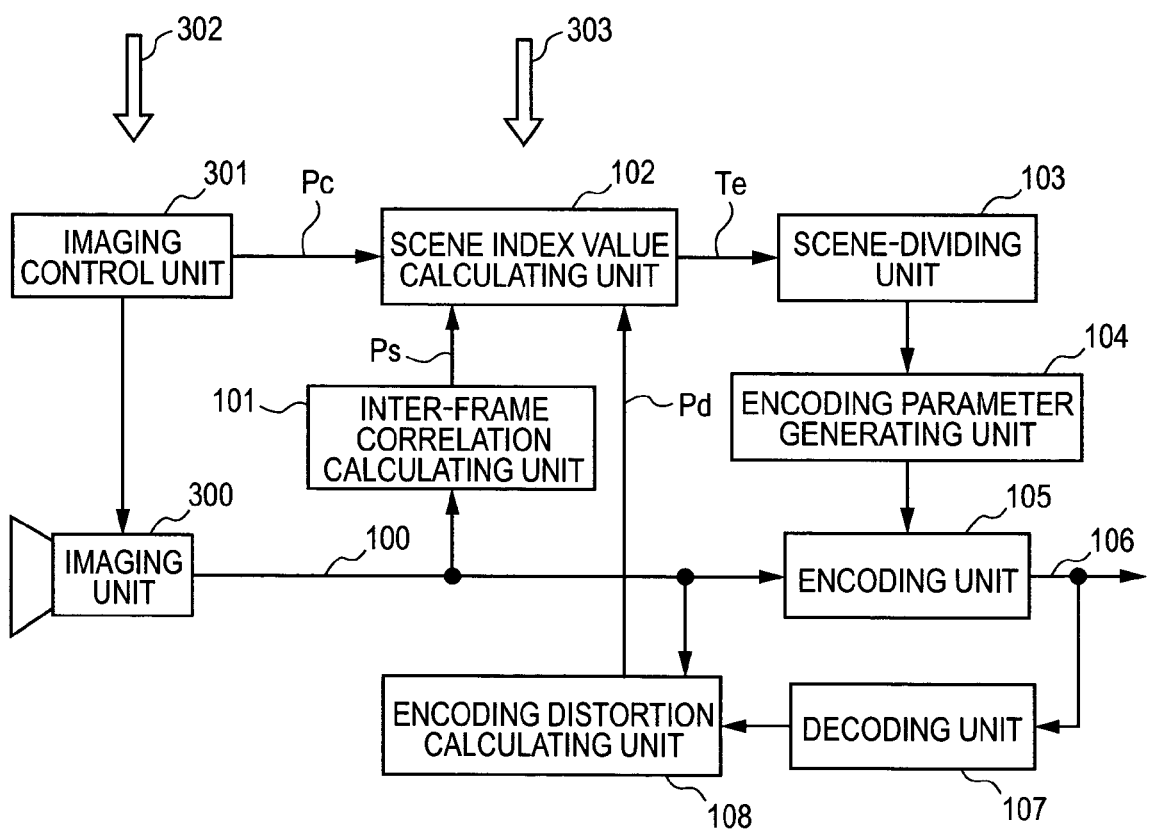
FIG. 3 shows the structure of an exemplary image-encoding apparatus according to a second exemplary embodiment.

FIG. 3 shows the structure of the exemplary image-encoding apparatus according to the second exemplary embodiment of the present invention. Reference numerals 100 to 108 and reference characters Te, Pc, Ps, and Pd in FIGS. 1 and 3 denote the same components. The image-encoding apparatus according to the second exemplary embodiment further includes an imaging unit 300 and an imaging control unit 301. The imaging unit 300 captures an image of a subject and outputs an input image 100. The imaging control unit 301 generates a camera parameter and controls the imaging unit 300. Reference numeral 302 denotes a user instruction for controlling the imaging unit 300 according to user operation, which is input to the imaging control unit 301 as an instruction signal. Reference numeral 303 denotes a weighting coefficient specifying instruction for specifying weighting coefficients ($\alpha$, $\beta$, and $\gamma$) according to user operation, which is input to a scene index value calculating unit 102 as another instruction signal.

Specifically, the user instruction 302 can be used by a user to freely control zoom operation, shooting mode selection, or the like. For example, when the user operates a zoom button (not shown) provided in the image-encoding apparatus, the user instruction 302, which is a signal that represents an instruction for zoom operation, is input to the imaging control unit 301. Then, the imaging control unit 301 sends an instruction for zoom operation to the imaging unit 300 and simultaneously outputs data indicating that zoom operation is being currently performed and the controlled variable (hereinafter referred to as control data) to the scene index value calculating unit 102 as the camera parameter Pc.

The scene index value calculating unit 102, which receives the camera parameter Pc, determines the weighting coefficients $\alpha$, $\beta$, and $\gamma$ with consideration of the controlled value and the zoom direction. For example, when zoom-in operation is performed and the zoom speed is slow, the scene index value calculating unit 102 determines that the weight of the target scene is large and adjusts the weighting coefficients $\alpha$, $\beta$, and $\gamma$ in response to the camera parameter Pc so that the value of the weighting coefficient $\alpha$ is relatively large. Moreover, in control operation corresponding to a shooting mode (for example, a sports mode or a portrait mode) of a camera besides zoom operation control, individual values of the weighting coefficients $\alpha$, $\beta$, and $\gamma$ are flexibly changed according to the user instruction and these changes are reflected in the scene index value Te to be output from the scene index value calculating unit 102.

Moreover, the user can directly specify the weighting coefficients $\alpha$, $\beta$, and $\gamma$ with the weighting coefficient specifying instruction 303. Specifically, combinations of values of the weighting coefficients $\alpha$, $\beta$, and $\gamma$ corresponding to various types of operations specified by the user, for example, zoom operation and camera mode selection, are prepared in advance and forcibly fixed. That is to say, when the user selects a specific operation or mode, individual values of the weighting coefficients $\alpha$, $\beta$, and $\gamma$ are correspondingly fixed. In this way, an image that has a stable quality, i.e., a user's intended image, can be obtained. Moreover, a method exists, in which the user instruction 302 and the weighting coefficient specifying instruction 303 are used in combination. In this method, values of the weighting coefficients $\alpha$, $\beta$, and $\gamma$ specified by the weighting coefficient specifying instruction 303 are used as initial values, and subsequently these values are changed according to the user instruction 302.

Third Exemplary Embodiment

An image-encoding apparatus according to a third exemplary embodiment of the present invention will now be described. The same reference numerals assigned to components of the image-encoding apparatus shown in FIG. 1 according to the first exemplary embodiment are assigned to corresponding components of the image-encoding apparatus according to the third exemplary embodiment. The distinction between the image-encoding apparatus according to the first exemplary embodiment and the image-encoding apparatus according to the third exemplary embodiment will mainly be described.

FIG. 4 shows the structure of the exemplary image-encoding apparatus according to the third exemplary embodiment of the present invention. Reference numerals 100 to 108 and reference characters Te, Pc, Ps, and Pd in FIGS. 1 and 4 denote the same components. An imaging unit 300 in FIG. 4 is equivalent to the imaging unit 300 according to the second exemplary embodiment in FIG. 3. The image-encoding apparatus according to the third exemplary embodiment further includes an imaging-control data calculating unit 400 that calculates a camera parameter Pc on the basis of the condition of the imaging unit 300.

The imaging-control data calculating unit 400 analyzes the condition of the imaging unit 300 and outputs the camera parameter Pc to a scene index value calculating unit 102. When the imaging unit 300 is in an unsteady condition (control transition condition), the imaging-control data calculating unit 400 analyzes the unsteady condition and incorporates the result of analysis into the camera parameter Pc. Specifically, the imaging-control data calculating unit 400 determines a specific type of the unsteady condition, in which at least one of focus control, iris control, and white balance control is in operation.

The imaging-control data calculating unit 400 according to the third exemplary embodiment classifies the unsteady condition into a plurality of levels on the basis of the result of analysis, as shown in FIG. 5. In FIG. 5, when the level is high, it is determined that the weight of an image that is currently being captured is small. When the level is low (the condition is close to a steady condition), it is determined that the weight is large. For example, at a level 3 that is the highest level in FIG. 5, focus, an iris, and white balance are being controlled. Thus, a user's intended image is not obtained. When this is the case, the imaging-control data calculating unit 400 determines that the weight of the current image is small and sets the current level to the level 3, incorporates this condition into the camera parameter Pc, and outputs the camera parameter Pc to the scene index value calculating unit 102. Thus, the scene index value calculating unit 102 recognizes that the weight of the current image is small and calculates the scene index value Te so that an unnecessary amount of code is not allocated to the current image.

In contrast, at a level 1 shown in FIG. 5, focus control, iris control, and white balance control are not in operation. Thus, it is determined that the imaging unit 300 is in the steady condition and the weight of the current image is large, and the scene index value Te is calculated so that allocation of the amount of code is accurately performed. The current condition is incorporated into the camera parameter Pc by, for example, changing the value of the camera parameter Pc significantly or embedding the level information in the camera parameter Pc. As described above, scene division in which the unsteady condition and the steady condition are distinguished from each other can be performed by updating the camera parameter Pc according to the condition of the imaging unit 300. Although the number of determination levels and criteria is limited to three in this exemplary embodiment for the sake of simplifying the illustration, the number is not limited to three. Moreover, any criteria for determining the level can be adopted.

Modification of Third Exemplary Embodiment

Figure 6:
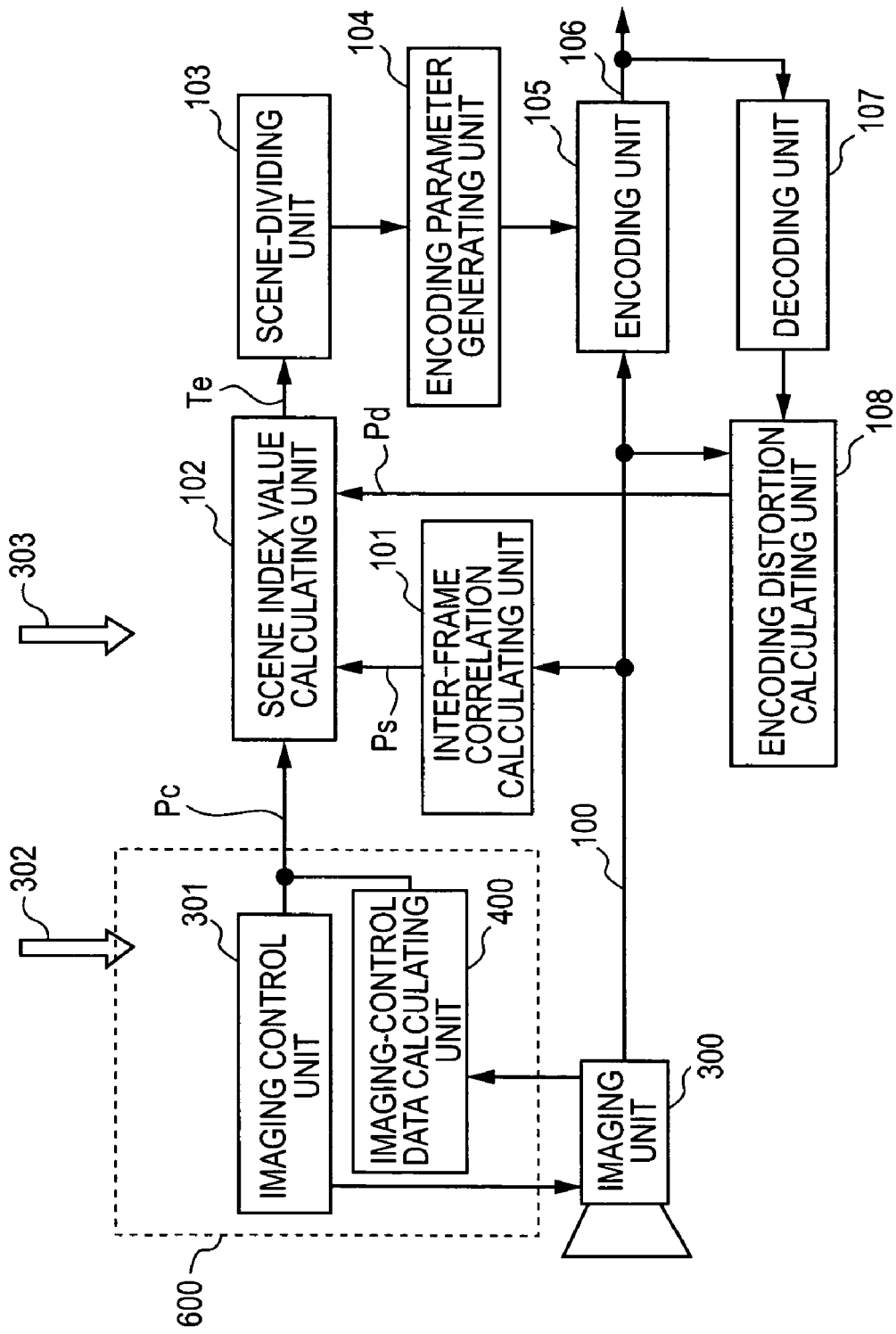
FIG. 6 shows the structure of an exemplary image-encoding apparatus according to a modification of the third exemplary embodiment.

The image-encoding apparatus according to the third exemplary embodiment can be used in combination with the imaging control unit 301 according to the second exemplary embodiment. FIG. 6 shows the structure of an exemplary image-encoding apparatus according to a modification of the third exemplary embodiment of the present invention. In this modification, in addition to condition data including a shooting condition that represents whether the current condition is the unsteady condition described above, the control data of the imaging unit 300 according to a control instruction from the user is used, as shown in FIG. 6. Thus, the shooting condition and control data of the imaging unit 300 are incorporated into the camera parameter Pc. A microcomputer may include the imaging control unit 301 and the imaging-control data calculating unit 400, as shown by a dashed line 600. In such a structure, GOP generation can be minutely and appropriately controlled with consideration of the control data from the user and the condition data of the imaging unit 300. For example, when the imaging unit 300 is in the unsteady condition, it can be determined whether the unsteady condition is caused by a user instruction or other factors. Thus, the scene index value calculating unit 102 can be most appropriately controlled.

Fourth Exemplary Embodiment

An image-encoding apparatus according to a fourth exemplary embodiment of the present invention will now be described. The same reference numerals assigned to components of the image-encoding apparatus shown in FIG. 1 according to the first exemplary embodiment are assigned to corresponding components of the image-encoding apparatus according to the fourth exemplary embodiment. The distinction between the image-encoding apparatus according to the first exemplary embodiment and the image-encoding apparatus according to the fourth exemplary embodiment will mainly be described.

Figure 7:
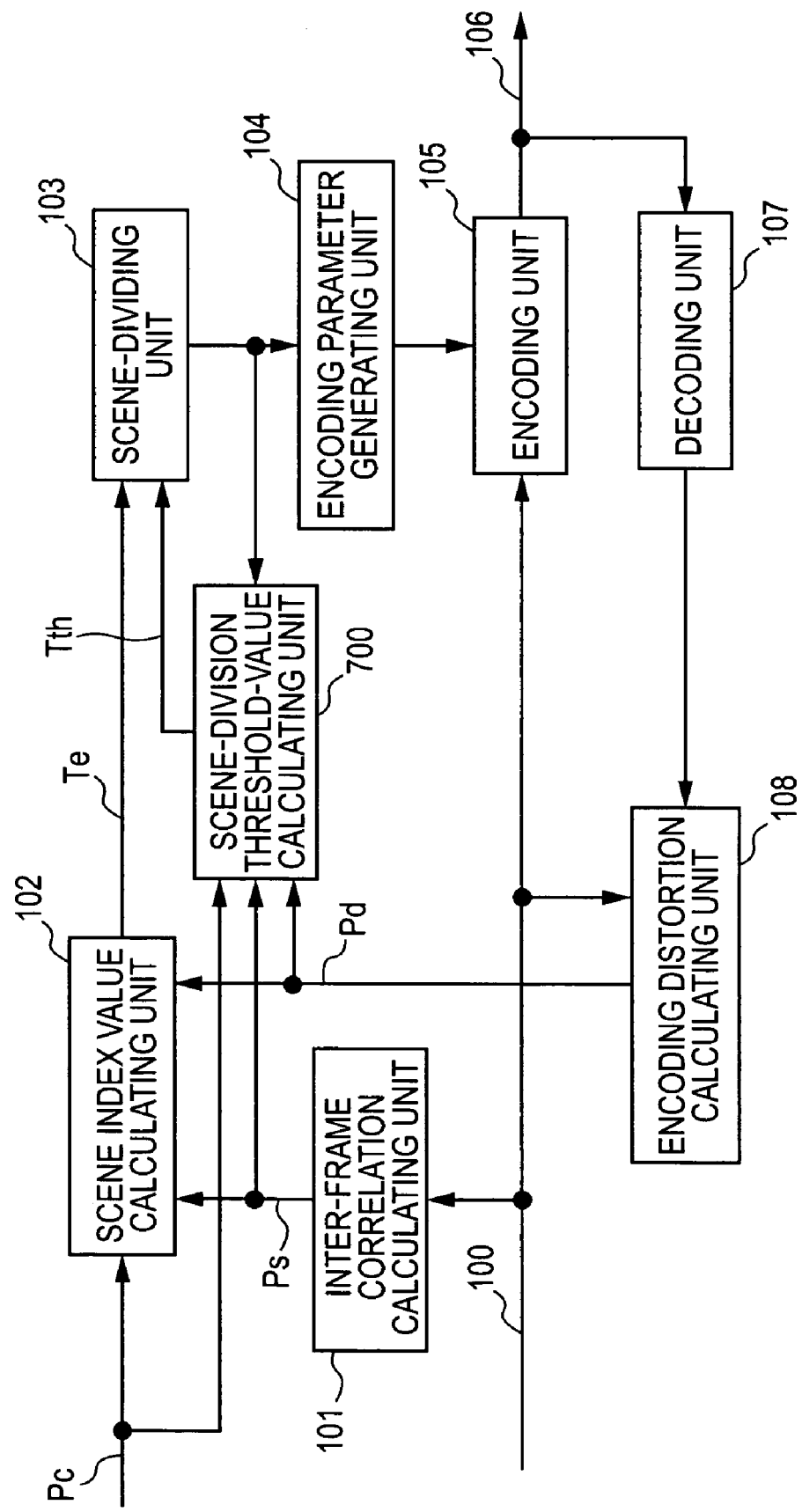
FIG. 7 shows the structure of an exemplary image-encoding apparatus according to a fourth exemplary embodiment.

FIG. 7 shows the structure of the exemplary image-encoding apparatus according to the fourth exemplary embodiment of the present invention. Reference numerals 100 to 108 and reference characters Te, Pc, Ps, and Pd in FIGS. 1 and 7 denote the same components. The exemplary image-encoding apparatus according to the fourth exemplary embodiment further includes a scene-division threshold-value calculating unit 700 that receives a camera parameter Pc that indicates the state of an input image 100, an inter-frame correlation Ps, and an encoding distortion amount Pd as inputs and outputs a scene division threshold value Tth. A scene-dividing unit 103 compares a scene index value Te output from a scene index value calculating unit 102 and the threshold value Tth output from the scene-division threshold-value calculating unit 700. When the scene index value Te exceeds the threshold value Tth, the scene-dividing unit 103 sends a scene division instruction to an encoding parameter generating unit 104 to generate a new GOP.

The operation of the image-encoding apparatus according to the fourth exemplary embodiment will now be described.

Figure 8:
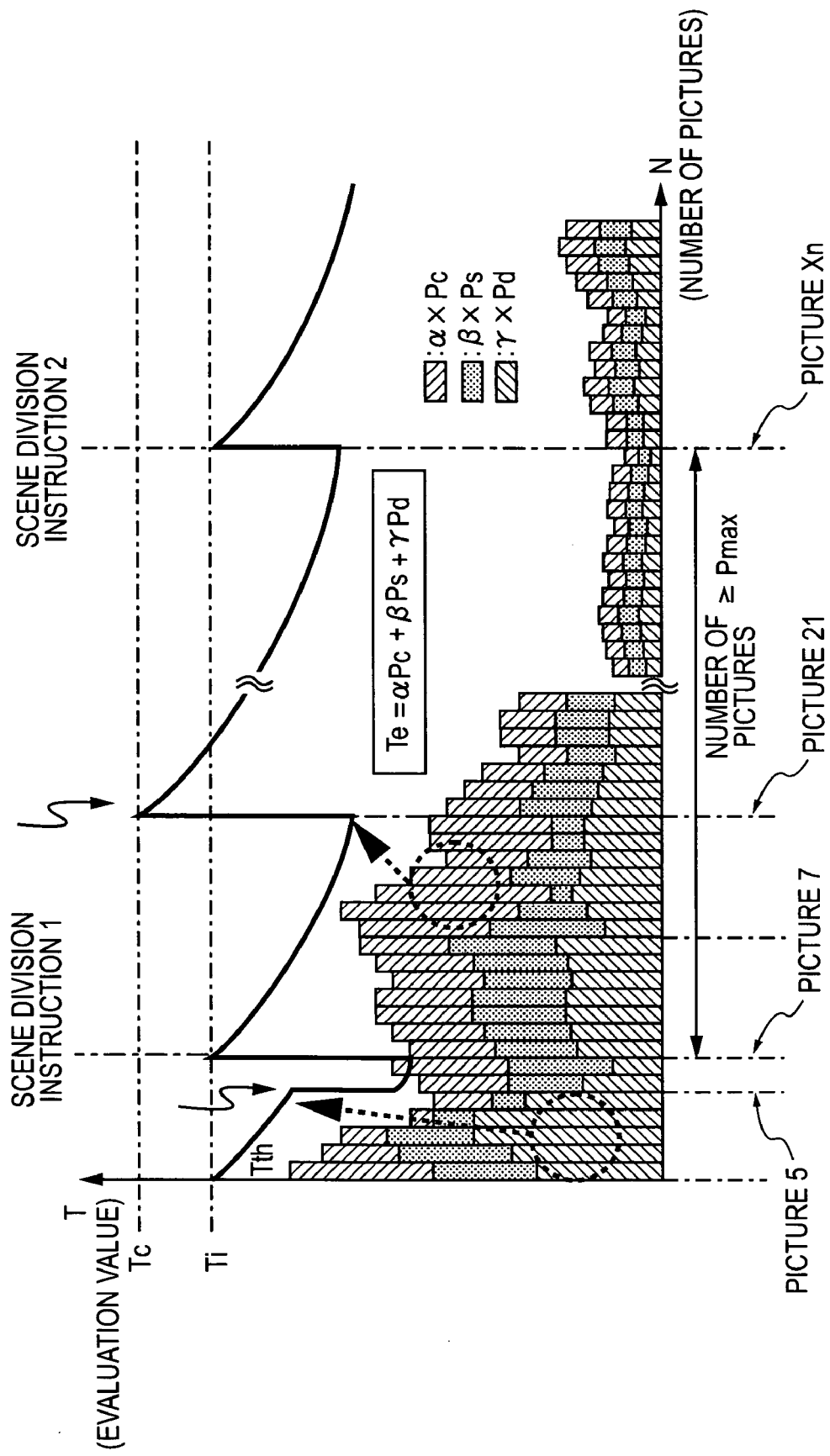
FIG. 8 shows an exemplary control process of a threshold value Tth in a scene-division threshold-value calculating unit.

When input of the input image 100 starts, the scene-division threshold-value calculating unit 700 outputs the threshold value Tth, which has an initial value Ti and decreases along a predetermined curve, as shown in FIG. 8. The scene-division threshold-value calculating unit 700 not only decreases the threshold value Tth along the predetermined curve, but also determines whether the rate of a decrease in the threshold value Tth is to be changed on the basis of the ratio among parameters Pc, Ps, and Pd, which are parameters of the scene index value Te, and the values of these parameters. FIG. 8 shows an exemplary control process of the threshold value Tth performed in the scene-division threshold-value calculating unit 700.

At a picture 5 in FIG. 8, $\alpha \times Pc$, $\beta \times Ps$, and $\gamma \times Pd$ in the period up to the picture 5 are compared with each other. In a case shown in FIG. 8, the ratio of $\gamma \times Pd$ is the largest and the value of $\gamma \times Pd$ is also large. Thus, the scene-division threshold-value calculating unit 700 determines that encoding distortion is accumulated and decreases the threshold value Tth to a value that is lower than a value derived from the predetermined curve. When the threshold value Tth is decreased, the likelihood that the scene index value Te exceeds the threshold value Tth increases, and a scene division instruction (an instruction for generating a new GOP) is likely to be issued. Thus, at a picture 7 in FIG. 8, the scene index value Te exceeds the threshold value Tth, and the scene-dividing unit 103 issues a scene division instruction to generate a new GOP. When the scene division instruction is issued, the scene-division threshold-value calculating unit 700 resets the threshold value Tth to the initial value Ti.

Then, at a picture 21, $\alpha \times Pc$, $\beta \times Ps$, and $\gamma \times Pd$ in the period up to the picture 21 are compared with each other. In the case shown in FIG. 8, the ratio of $\alpha \times Pc$ is the largest and the value of $\alpha \times Pc$ is also large. Thus, the scene-division threshold-value calculating unit 700 determines that camera control is not stable and increases the threshold value Tth. At this time, the scene-division threshold-value calculating unit 700 determines that processing of images having a small weight is currently continuing on the basis of the ratio among parameters Pc, Ps, and Pd, and the values of these parameters, and sets the threshold value Tth to an initial value Tc that is larger than the initial value Ti. Subsequently, the scene-dividing unit 103 issues a scene division instruction at a picture Xn where the count of the number of pictures exceeds the maximum number Pmax, as in the exemplary embodiment described above.

As described above, even when the input image 100 slowly changes and it is difficult to distinguish a scene from other scenes, an appropriate scene division can be performed by changing the threshold value Tth according to changes in the individual parameters. In FIG. 8, an exemplary method for changing the threshold value Tth is illustrated. Even in a case where the encoding distortion amount Pd, which is accumulated, is large, when the scene-division threshold-value calculating unit 700 determines that the weight of the corresponding scene is small, the threshold value Tth need not be decreased. Moreover, instead of changing the threshold value Tth, the shape of the curve, along which the threshold value Tth is decreased, may be changed. In this exemplary embodiment, methods for determining relevant values are not restricted.

Modification of Fourth Exemplary Embodiment

Figure 9:
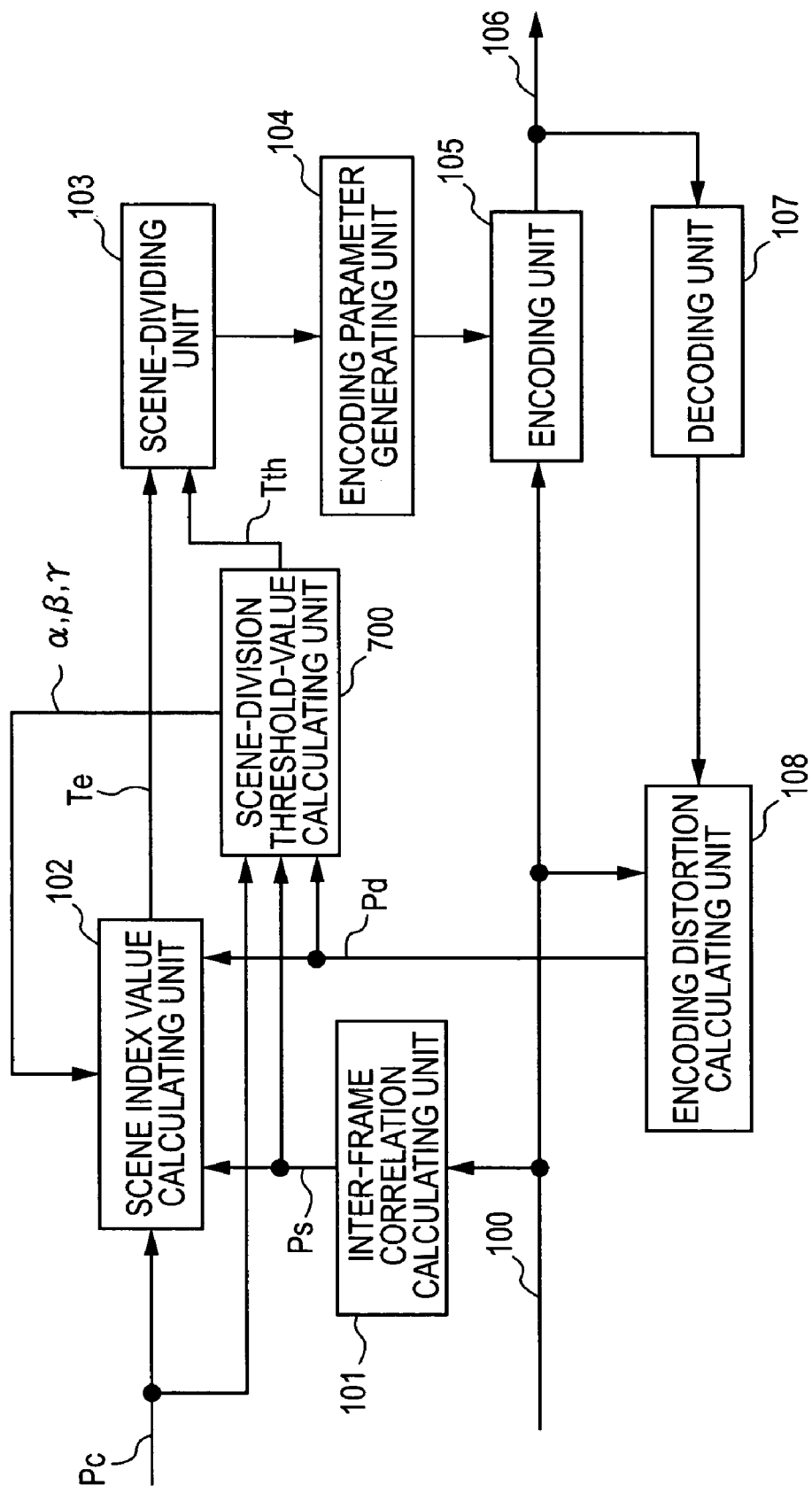
FIG. 9 shows the structure of an exemplary image-encoding apparatus according to a modification of the fourth exemplary embodiment.

An image-encoding apparatus according to a modification of the fourth exemplary embodiment described above will now be described. FIG. 9 shows the structure of the exemplary image-encoding apparatus according to the modification of the fourth exemplary embodiment of the present invention. The image-encoding apparatus shown in FIG. 9 has substantially the same structure as the image-encoding apparatus according to the fourth exemplary embodiment shown in FIG. 7. This modification is different from the fourth exemplary embodiment in that a scene-division threshold-value calculating unit 700 not only outputs a threshold value Tth for scene division but also outputs data for updating weighting coefficients $\alpha$, $\beta$, and $\gamma$ that are used for calculating a scene index value Te to a scene index value calculating unit 102 in this modification.

The scene-division threshold-value calculating unit 700 monitors changes in and values of input parameters Pc, Ps, and Pd to calculate the threshold value Tth, and thus can determine a degree of inconsistency between the current weighting coefficients and an actual output except in a case where the weighting coefficients are intentionally changed. Thus, an optimum scene division can be performed by appropriately changing the weighting coefficients $\alpha$, $\beta$, and $\gamma$ so as to remove the inconsistency.

The flow of the process for determining scene division according to the modification of the fourth exemplary embodiment will now be described.

Figure 10:
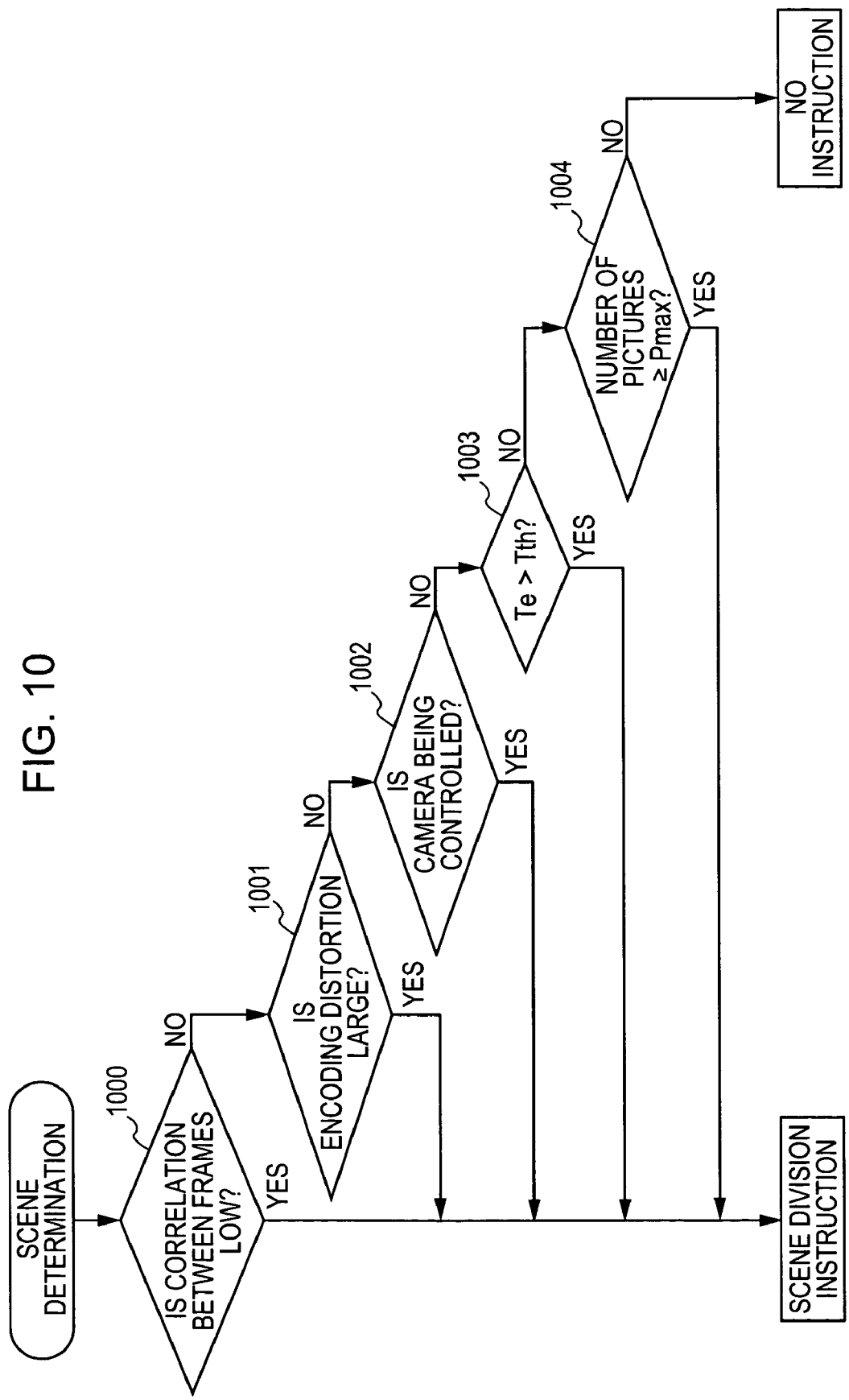
FIG. 10 is a flowchart showing the flow of the process for determining scene division according to the modification of the fourth exemplary embodiment.

FIG. 10 is a flowchart showing the flow of the process for determining scene division according to the modification of the fourth exemplary embodiment. The process shown in FIG. 10 does not include steps for appropriately updating the threshold value Tth and the weighting coefficients $\alpha$, $\beta$, and $\gamma$. These values need to be changed before the process for determining scene division is performed.

In step 1000, the scene index value calculating unit 102 checks the value of $\beta \times Ps$ that represents an inter-frame correlation. When it is determined that the inter-frame correlation is high, the process proceeds to step 1001 where the scene index value calculating unit 102 checks the value of $\gamma \times Pd$ that represents the amount of encoding distortion. When it is determined that the amount of encoding distortion is small, the process proceeds to step 1002 where the value of $\alpha \times Pc$ that represents a camera parameter is checked. When it is determined on the basis of the camera parameter that an imaging unit is not being controlled, the process proceeds to step 1003 where a scene index value Te that is the total of the values of the parameters is compared with the threshold value Tth. When it is determined that the scene index value Te≦the threshold value Tth, the process proceeds to step 1004 where the scene index value calculating unit 102 compares the count of the number of pictures with the maximum number Pmax of pictures. When it is determined that the count of the number of pictures is less than the maximum number Pmax of pictures, a scene-dividing unit 103 does not issue a scene division instruction. When the alternative option is applicable in each of steps 1000 to 1004, the scene-dividing unit 103 issues a scene division instruction.

In the process described above, the individual parameters are first checked. In FIG. 10, the individual parameters are checked in order of the inter-frame correlation, the amount of encoding distortion, and the camera parameter. This is an exemplary arrangement in which the priority of each check step is determined according to the level of importance of each parameter corresponding to each check step in scene division. Thus, the sequence of checking the individual parameters may be freely changed according to a change in the scene.

After the individual parameters are checked, the scene index value Te, which is the total of the values of the parameters, is compared with the threshold value Tth, and then the count of the number of pictures is compared with the maximum number Pmax. When predetermined conditions are not satisfied in all of the check steps described above, the scene division instruction is not issued. The necessity of scene division is determined by the process described above. In order to obtain a group of scenes that have the same weight, the scene-dividing unit 103 determines which step for checking the parameter causes the current GOP to be generated and controls an encoding parameter generating unit 104. For example, in a case where a scene division instruction is issued when it is determined on the basis of the value of $\alpha \times Pc$, which represents the camera parameter, in step 1002 that the imaging unit is being controlled, the current condition is the unsteady condition. Thus, the weight of the current scene is small, and the encoding parameter generating unit 104 generates encoding parameters that suppress an increase in the amount of code. On the other hand, in a case where a scene division instruction is issued when it is determined in step 1001 that the value of $\gamma \times Pd$, which represents the amount of encoding distortion, is large, the encoding parameter generating unit 104 generates encoding parameters that increase the amount of code. An optimum bit rate control can be achieved in the process described above.

In this exemplary embodiment and the modification of this exemplary embodiment, details of the process for controlling the amount of code are not restricted.

As described above, in the image-encoding apparatuses according to this exemplary embodiment and the modification of this exemplary embodiment, the structure of a GOP is changed according to a camera parameter, input image data, and encoding data so that the inter-frame correlation within each GOP is high. Thus, allocation of a target amount of code can be easily performed, thus achieving an effective bit rate control.

Fifth Exemplary Embodiment

Figure 11:
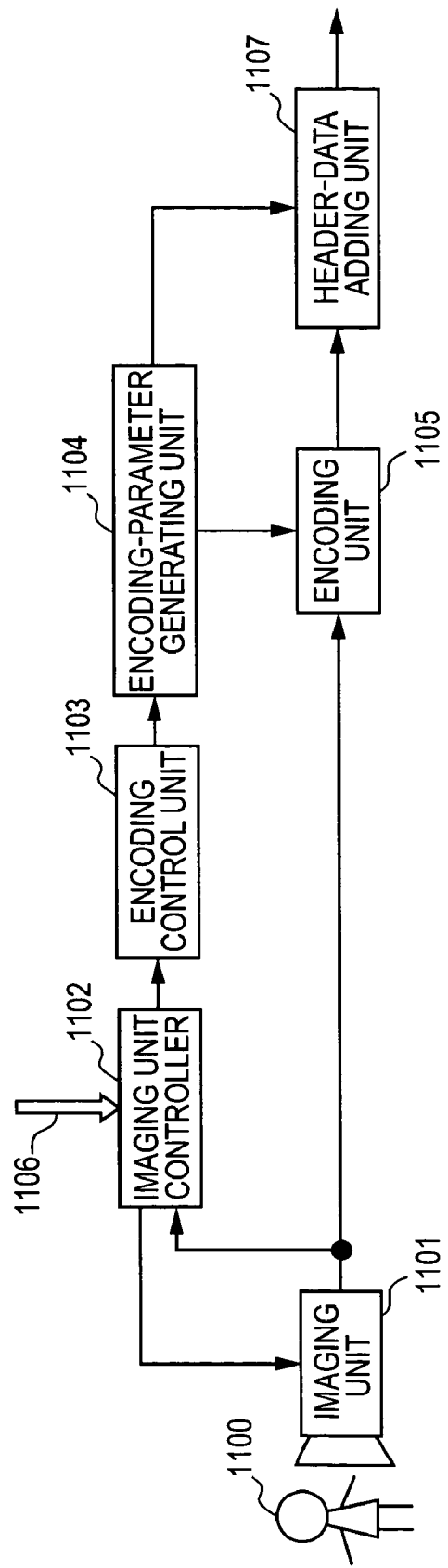
FIG. 11 shows the structure of an exemplary image-encoding apparatus according to a fifth exemplary embodiment.

FIG. 11 shows the structure of an exemplary image-encoding apparatus according to a fifth exemplary embodiment of the present invention.

The image-encoding apparatus according to the fifth exemplary embodiment includes an imaging unit 1101, an imaging unit controller 1102, an encoding control unit 1103, an encoding-parameter generating unit 1104, an encoding unit 1105, and a header-data adding unit 1107. The imaging unit 1101 captures an image of a subject 1100 and outputs moving image data. The imaging unit controller 1102 generates a control parameter (hereinafter referred to as a camera parameter) of the imaging unit 1101 upon receiving the moving image data output from the imaging unit 1101 and a request from the user and controls the imaging unit 1101. The encoding control unit 1103 controls an encoding process upon receiving the camera parameter. The encoding-parameter generating unit 1104 generates parameters for encoding moving images. The encoding unit 1105 encodes the moving images on the basis of the parameters, which are set. Reference numeral 1106 denotes a user action that is input to the imaging unit controller 1102 as a signal that represents an instruction for, e.g., starting or stopping shooting an image or operating a zoom, from the user. The header-data adding unit 1107 adds heeder data to the encoded data.

The control flow will now be described with reference to FIG. 11. The imaging unit controller 1102 receives the user action 1106 as an instruction and controls the imaging unit 1101. The imaging unit 1101 captures an image of the subject 1100 according to an instruction from the imaging unit controller 1102, converts the image to digital moving image data, and outputs the digital moving image data to the encoding unit 1105. The imaging unit 1101 also outputs data related to conditions of focus, an iris, white balance, and the like at the time of capturing the image (hereinafter referred to as shooting data) and the moving image data to the imaging unit controller 1102.

The imaging unit controller 1102 analyzes the condition of the subject 1100 on the basis of the shooting data and moving image data output from the imaging unit 1101 and the user action 1106 to perform control so that the imaging unit 1101 is in an optimum shooting condition and outputs control data to the encoding control unit 1103 as a camera parameter.

The encoding control unit 1103 receives the camera parameter from the imaging unit controller 1102 and outputs an instruction for changing the structure of a GOP, a request for setting a target amount of code, and the like to the encoding-parameter generating unit 1104. A series of operations described above is always performed during the period in which the imaging unit 1101 is operating. On the other hand, the encoding-parameter generating unit 1104 generates header data that is added to encoded data and encoding parameters that are required for encoding, for example, parameters for setting amounts of code and picture types of individual pictures, according to the instruction from the encoding control unit 1103. The encoding unit 1105 encodes the moving image data on the basis of the encoding parameters generated by the encoding-parameter generating unit 1104 and outputs the encoded image data. The header-data adding unit 1107 adds the header data generated by the encoding-parameter generating unit 1104 to the encoded image data output from the encoding unit 1105 and outputs the resulting data as encoded data.

Figure 12:
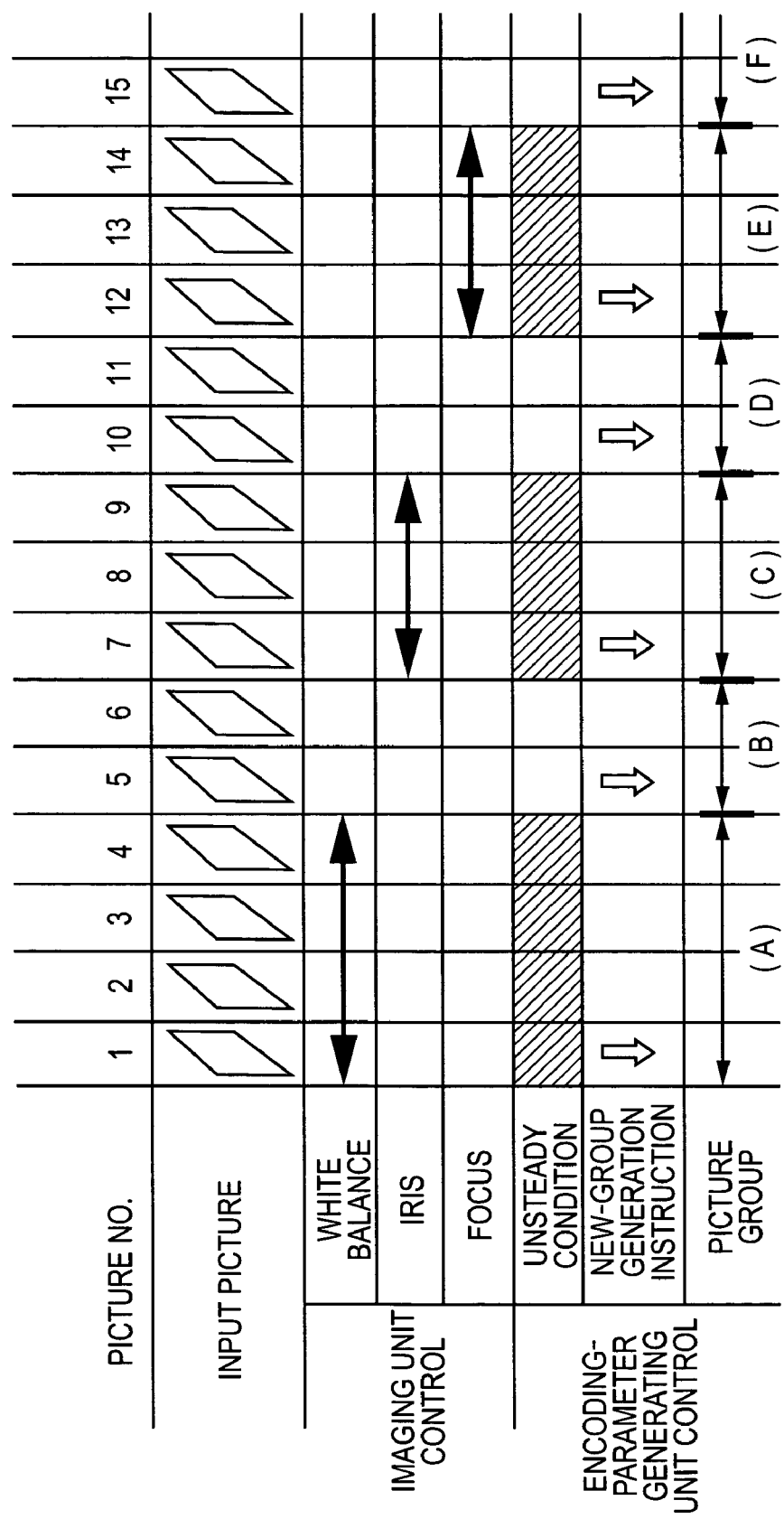
FIGS. 12, 13, and 14 show conditions of control of an imaging unit by an imaging unit controller and conditions of control of an encoding-parameter generating unit by an encoding control unit.

An exemplary operation of the encoding control unit 1103 described above will now be described in detail with reference to FIGS. 12 and 13. FIG. 12 shows conditions of control of the imaging unit 1101 by the imaging unit controller 1102 and conditions of control of the encoding-parameter generating unit 1104 by the encoding control unit 1103. In a case shown in FIG. 12, a plurality of types of control of the imaging unit 1101 by the imaging unit controller 1102 (controls of white balance, an iris, focus) do not overlap each other. Picture numbers 1 to 15 are assigned to individual pictures (individual frames) in the moving image data (input pictures) output from the imaging unit 1101 to identify the individual pictures.

White balance control is in operation for pictures 1 to 4, iris control is in operation for pictures 7 to 9, and focus control is in operation for pictures 12 to 14. That is to say, the imaging unit controller 1102 controls the imaging unit 1101 so as to change a shooting condition of the imaging unit 1101 for periods from the picture 1 to the picture 4, from the picture 7 to the picture 9, and from the picture 12 to the picture 14, and outputs a camera parameter indicating the condition of control to the encoding control unit 1103. The encoding control unit 1103 determines that the imaging unit 1101 is in the unsteady condition for the periods from the picture 1 to the picture 4, from the picture 7 to the picture 9, and from the picture 12 to the picture 14 on the basis of the camera parameter.

When the imaging unit controller 1102 determines that white balance is inappropriate at a picture preceding the picture 1, the imaging unit controller 1102 starts to control the imaging unit 1101 for adjusting the white balance at the time of capturing the picture 1. Simultaneously, the imaging unit controller 1102 outputs the condition of control to the encoding control unit 1103 as the camera parameter. Then, the encoding control unit 1103 sends an instruction for completing a GOP up to the picture preceding the picture 1 and generating a new GOP (A) to the encoding-parameter generating unit 1104 upon receiving the camera parameter.

Subsequently, when the imaging unit controller 1102 determines that the white balance is set to normal just before a picture 5 is captured, the imaging unit controller 1102 outputs the camera parameter indicating that white balance control is completed to the encoding control unit 1103. The encoding control unit 1103 sends an instruction for completing the GOP (A) and generating a new GOP (B) to the encoding-parameter generating unit 1104 when the white balance is set to normal just before the picture 5 is captured.

In the same way, the encoding control unit 1103 sends an instruction for completing the GOP (B) and generating a new GOP (C) to the encoding-parameter generating unit 1104 when iris control starts at the picture 7, and an instruction for completing the GOP (C) and generating a new GOP (D) to the encoding-parameter generating unit 1104 when iris control is completed just before a picture 10 is captured. Then, the encoding control unit 1103 sends an instruction for completing the GOP (D) and generating a new GOP (E) to the encoding-parameter generating unit 1104 when focus control starts at the picture 12, and an instruction for completing the GOP (E) and generating a new GOP (F) to the encoding-parameter generating unit 1104 when focus control is completed just before a picture 15 is captured. The unsteady condition shown by oblique lines in FIG. 12 represents that the imaging unit 1101 is being controlled so that the condition of the imaging unit 1101 is changed.

As described above, in the image-encoding apparatus according to this exemplary embodiment, a new GOP is generated every time the condition of the imaging unit 1101 is changed. Thus, it can be determined for individual GOPs whether the condition of the imaging unit 1101 is the unsteady condition.

Figure 13:
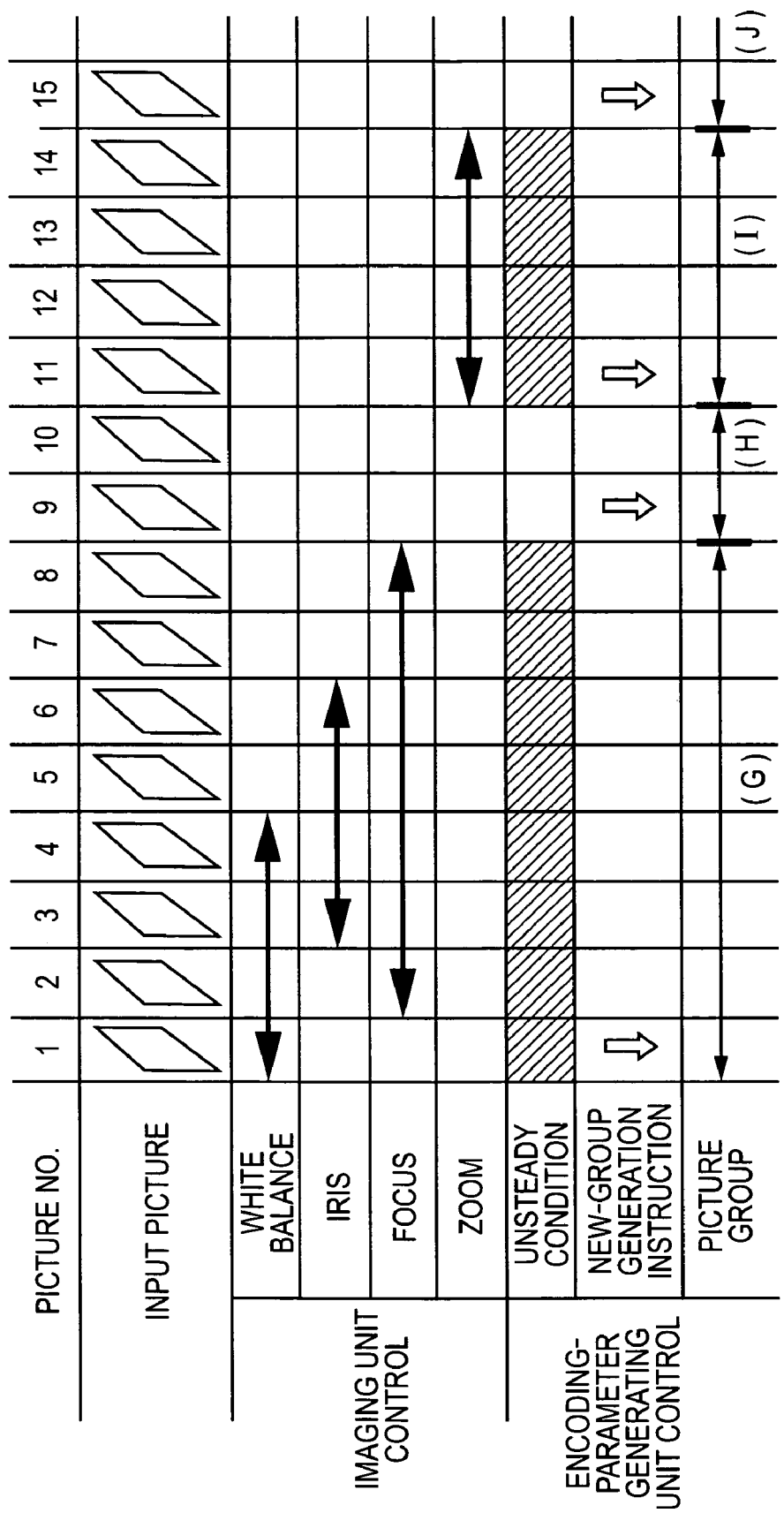

FIG. 13 shows conditions of control of the imaging unit 1101 by the imaging unit controller 1102 and conditions of control of the encoding-parameter generating unit 1104 by the encoding control unit 1103. A case shown in FIG. 13 is different from the case shown in FIG. 12 in that a plurality of types of control of the imaging unit 1101 overlap each other and a user action 1106 occurs in the case shown in FIG. 13. In FIG. 13, white balance control is in operation for pictures 1 to 4, iris control is in operation for pictures 3 to 6, focus control is in operation for pictures 2 to 8, and zoom control is performed in response to the user action 1106 for pictures 11 to 14.

When the imaging unit controller 1102 determines that white balance is inappropriate at a picture preceding the picture 1, the imaging unit controller 1102 starts to control the imaging unit 1101 for adjusting the white balance at the time of capturing the picture 1, as in the case shown in FIG. 12. Simultaneously, the imaging unit controller 1102 outputs the condition of control to the encoding control unit 1103 as the camera parameter.

Then, the encoding control unit 1103 sends an instruction for completing a GOP up to the picture preceding the picture 1 and generating a new GOP (G) to the encoding-parameter generating unit 1104 upon receiving the camera parameter. In a case where the imaging unit controller 1102 also determines that focus is inappropriate at the picture 1 while the white balance is being adjusted, the imaging unit controller 1102 starts to control the imaging unit 1101 for adjusting focus at the time of capturing the picture 2 while the white balance is being adjusted, and outputs the condition of control to the encoding control unit 1103 as the camera parameter. In this case, the encoding control unit 1103 does not send an instruction for generating a new GOP to the encoding-parameter generating unit 1104.

Similarly, when the encoding control unit 1103 starts to control the iris at the picture 3, the encoding control unit 1103 does not send an instruction for generating a new GOP to the encoding-parameter generating unit 1104. When white balance control, focus control, and iris control are completed and the condition is not the unsteady condition at a picture 9, the encoding control unit 1103 sends an instruction for completing the GOP (G) and generating a new GOP (H) to the encoding-parameter generating unit 1104.

When zoom operation that is the user action is performed at the picture 11, the imaging unit controller 1102 controls the imaging unit 1101 for adjusting zoom and outputs the condition of control to the encoding control unit 1103 as the camera parameter at the same time. Then, the encoding control unit 1103 sends an instruction for completing the GOP (H) and generating a new GOP (I) to the encoding-parameter generating unit 1104 upon receiving the camera parameter. Similarly, the encoding control unit 1103 sends an instruction for completing the GOP (I) and generating a new GOP (J) to the encoding-parameter generating unit 1104 at the picture 15 where zoom operation is completed.

Figure 14:
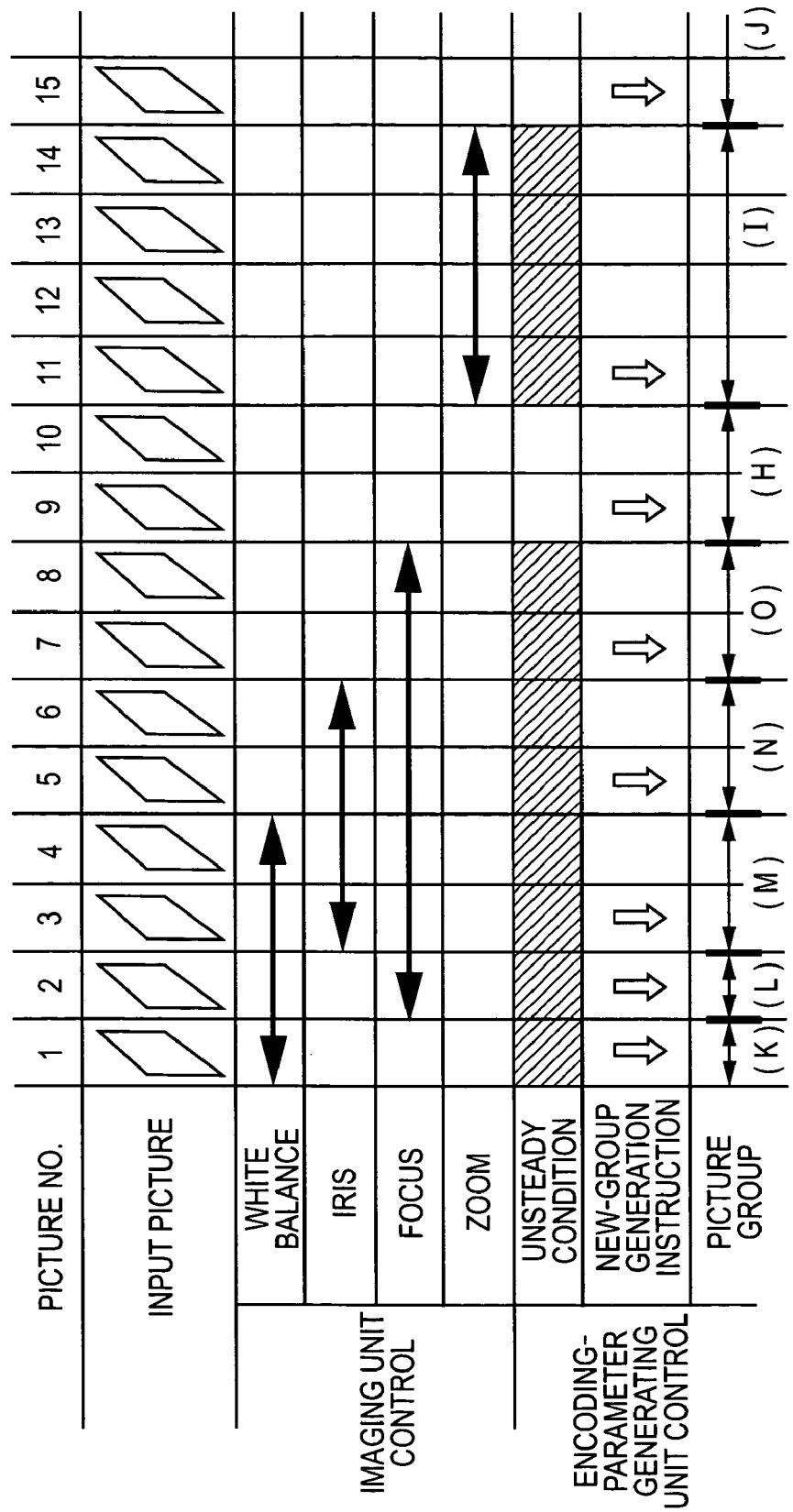

In the case shown in FIG. 13, when the plurality of types of control of the imaging unit 1101 overlap each other, GOP generation can be controlled on the basis of whether the imaging unit 1101 is being controlled (whether the condition is the unsteady condition) regardless of types of control. Instead of a method for controlling a GOP shown in FIG. 13, another method for controlling a GOP shown in FIG. 14 may be adopted. FIG. 14 shows conditions of control of the imaging unit 1101 by the imaging unit controller 1102 and conditions of control of the encoding-parameter generating unit 1104 by the encoding control unit 1103.

In FIG. 13, one GOP (G) is generated during the period in which the plurality of types of control overlap each other. On the other hand, in FIG. 14, five GOPs, i.e., a GOP (K), a GOP (L), a GOP (M), a GOP (N), and a GOP (O), are generated during the same period. In this way, one GOP can be generated minutely compared with that in the case shown in FIG. 13 for each of the plurality of types of control, which overlap each other. Thus, processing of each GOP can be changed.

Various advantages can be achieved by changing the structure of a GOP according to the condition of the imaging unit 1101, as shown in FIGS. 12 to 14. The unsteady condition of the imaging unit 1101 is substantially the same as a condition in which a user's intended image is not obtained. That is to say, it can be determined that an image that is captured in the unsteady condition is not important for the user, and an unnecessary amount of code can be suppressed by setting a small target amount of code.

In a case where a limited recording medium is used, an advantage can be achieved by suppressing an increase in the amount of code, as described above, such that remaining recording time can be extended. Alternatively, an unallocated amount of code may be reserved, and the unallocated amount of code may be added to a target amount of code to perform encoding that achieves a satisfactory image quality when the imaging unit 1101 is out of the unsteady condition. Moreover, an arrangement can be readily implemented, in which information about the unallocated amount of code is presented to the user and the user freely decides how to allocate the unallocated amount of code. Moreover, an algorithm can be used, in which a target amount of code is appropriately allocated with consideration of factors of the unsteady condition. The algorithm for allocating a target amount of code is not described here. As described above, in the image-encoding apparatus according to this exemplary embodiment, the amount of code can be efficiently controlled by changing the structure of a GOP through the camera parameter of the imaging unit 1101.

Sixth Exemplary Embodiment

An exemplary method for generating encoding parameters in an image-encoding apparatus according to a sixth exemplary embodiment of the present invention will now be described. The structure of the image-encoding apparatus according to the sixth exemplary embodiment is the same as that according to the fifth exemplary embodiment shown in FIG. 11, and thus is not described here. The image-encoding apparatus according to the sixth exemplary embodiment is different in the process in an encoding-parameter generating unit 1104 from that according to the fifth exemplary embodiment.

Figure 15:
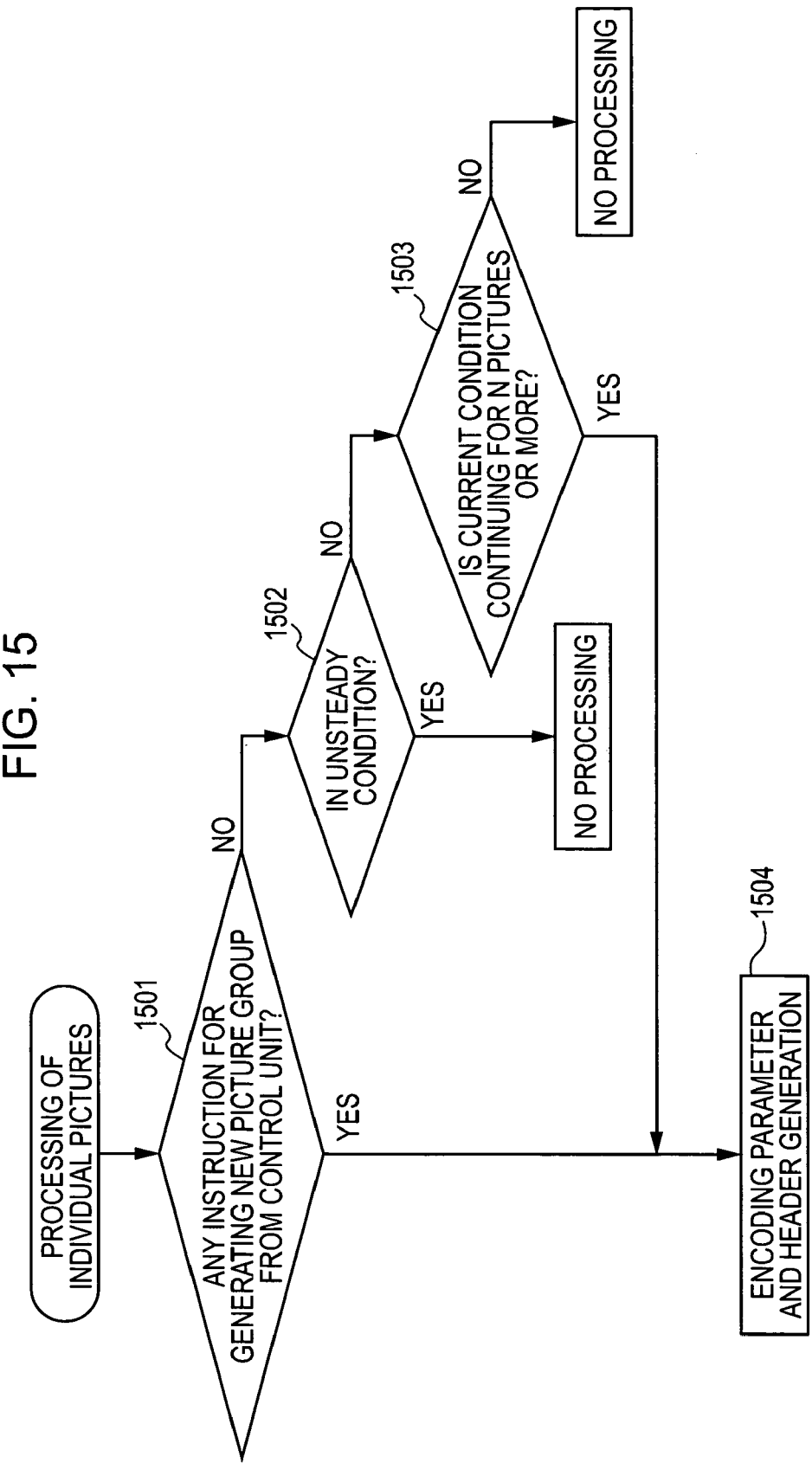
FIG. 15 is a flowchart showing the process in an encoding-parameter generating unit according to a sixth exemplary embodiment.

FIG. 15 is a flowchart showing the process in the encoding-parameter generating unit 1104 according to the sixth exemplary embodiment. The process shown in FIG. 15 is performed for individual input pictures. In step 1501, the encoding-parameter generating unit 1104 determines whether an instruction for generating a new GOP is sent from an encoding control unit 1103. When the encoding-parameter generating unit 1104 determines that an instruction for generating a new GOP is sent from the encoding control unit 1103, the process proceeds to step 1504 and the encoding-parameter generating unit 1104 sets the current picture as the first picture of a new GOP, generates a new GOP header, and sets encoding parameters, for example, a picture type and a target amount of code, for an encoding unit 1105 under the control of the encoding control unit 1103.

On the other hand, when the encoding-parameter generating unit 1104 determines that an instruction for generating a new GOP is not sent from the encoding control unit 1103, the process proceeds to step 1502 and the encoding-parameter generating unit 1104 determines whether an imaging unit 1101 is in the unsteady condition on the basis of control data from the encoding control unit 1103. When the encoding-parameter generating unit 1104 determines that the imaging unit 1101 is in the unsteady condition, the encoding-parameter generating unit 1104 waits for the next picture input. On the other hand, when the encoding-parameter generating unit 1104 determines that the imaging unit 1101 is not in the unsteady condition, the process proceeds to step 1503 and the encoding-parameter generating unit 1104 checks the structure of the current GOP. Specifically, the encoding-parameter generating unit 1104 checks how many pictures captured in the steady condition have continued in the current GOP.

When the encoding-parameter generating unit 1104 determines that the number of the successive pictures captured in the steady condition in the current GOP is less than a predetermined number N, the encoding-parameter generating unit 1104 waits for the next picture input. On the other hand, when the encoding-parameter generating unit 1104 determines that the number of the successive pictures captured in the steady condition in the current GOP is equal to or exceeds the predetermined number N, the process proceeds to step 1504 and the encoding-parameter generating unit 1104, generates a new GOP header as the start of a new GOP without receiving an instruction for generating a new GOP from the encoding control unit 1103. In this case, the parameters of the preceding GOP are used as those of the new GOP.

When a change in the condition of the imaging unit 1101 or a user action 1106 occurs, the encoding control unit 1103 according to this exemplary embodiment sends an instruction for generating a new GOP to the encoding parameter generating unit 1104 on the basis of a camera parameter that is obtained through an imaging unit controller 1102. Otherwise, the encoding control unit 1103 according to this exemplary embodiment does not issue an instruction for generating a new GOP. However, even when an instruction for generating a new GOP is not issued, the encoding-parameter generating unit 1104 counts the number of successive pictures captured in a condition other than the unsteady condition in the current GOP and periodically refreshes the GOP, as shown in FIG. 15. Thus, problems with an encoding method that uses inter-frame predictive encoding can be resolved, such that, in a case where the number of pictures in a GOP is excessive, residual data are accumulated, thus deteriorating the image quality, and edit of the encoded data is cumbersome. The predetermined number N, which is a refresh cycle, is not restricted in the encoding-parameter generating unit 1104 according to this exemplary embodiment. However, in general, a GOP should be refreshed at intervals of about 0.5 seconds, and the predetermined number N corresponding to each interval is set.

Seventh Exemplary Embodiment

An exemplary method for determining the structure of a GOP in an image-encoding apparatus according to a seventh exemplary embodiment of the present invention will now be described. The structure of the image-encoding apparatus according to the seventh exemplary embodiment is the same as that according to the fifth exemplary embodiment shown in FIG. 11, and thus is not described here. The image-encoding apparatus according to the seventh exemplary embodiment is different in the process for generating a GOP in an encoding-parameter generating unit 1104 from that according to the fifth exemplary embodiment.

The exemplary method for determining an arrangement of pictures in a GOP according to the seventh exemplary embodiment will now be described with reference to FIGS. 16 to 20. FIGS. 16 to 20 show exemplary sequences of encoding input pictures when an encoding control unit 1103 issues an instruction for generating a new GOP.

Figure 16:
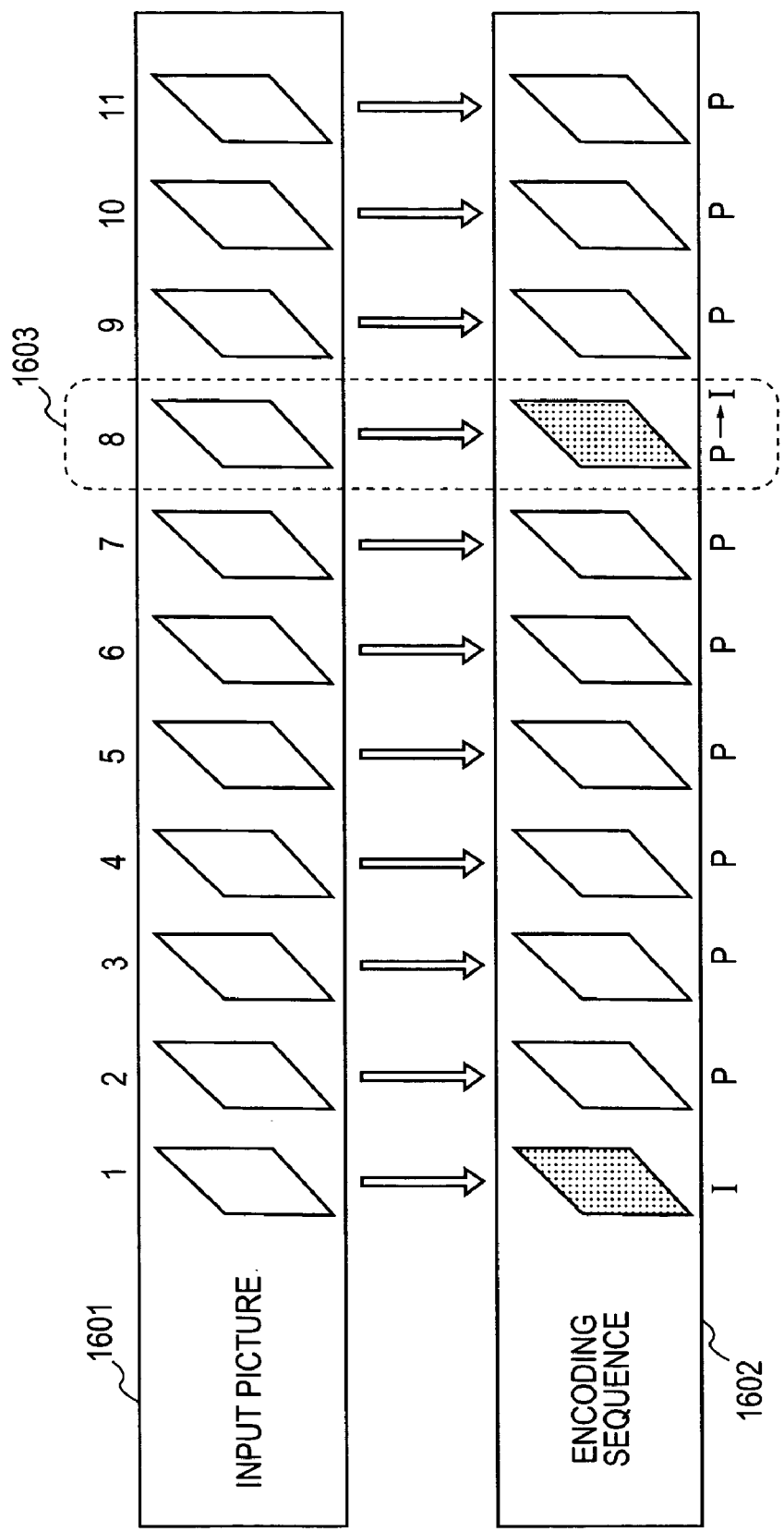
FIGS. 16, 17, 18, 19, and 20 show exemplary sequences of encoding of input pictures when an encoding control unit issues an instruction for generating a new GOP.

In FIG. 16, reference numeral 1601 denotes input pictures, and reference numeral 1602 denotes pictures that are obtained by reordering the input pictures 1601 in encoding sequence (hereinafter referred to as reordered pictures). Reference numeral 1603 denotes a frame that shows an input picture 1601 and a reordered picture 1602 at the time when the encoding control unit 1103 issues an instruction for generating a new GOP. Picture numbers are indicated above the individual input pictures 1601. Picture types I and P are indicated under the corresponding reordered pictures 1602.

The sequence (in the horizontal direction) shown by picture numbers represents time flow (the order of input pictures). In FIG. 16, the sequence of pictures in a case where the picture types I and P are used to encode images is shown. The picture type I represents an intra-frame encoded picture, and the picture type P represents an inter-frame encoded picture obtained by forward prediction. It is assumed in FIG. 16 that the number of pictures in a GOP is equal to or more than eleven and only one I picture exists in a case where the encoding control unit 1103 does not issue an instruction for generating a new GOP.

When the input pictures 1601 are input in ascending order of picture numbers, as shown by the input pictures 1601 in FIG. 16, the reordered pictures 1602 are encoded in the same order as the input pictures 1601. Process in a case where the encoding control unit 1103 issues an instruction for generating a new GOP at the frame 1603 will now be described. The input picture 1601 at the frame 1603, which would be encoded as the P picture if the instruction were not issued, is encoded as the I picture according to the instruction. The sequence of the input pictures is the same as the sequence of encoding. Thus, even when the P picture is changed to the I picture, there is no problem with the sequence. The P picture is encoded on the basis of the difference between the input picture 1601 having picture number 8 and a preceding input picture 1601 having picture number 7, and the I picture is encoded within a frame. Thus, when the P picture is changed to the I picture, the correlation between the input picture 1601 having picture number 8 and the input picture 1601 having picture number 7 need not be considered, and the input picture 1601 having picture number 8 is an independent picture. When encoding is performed only with the I and P pictures, as described above, a complicated process for changing the structure of a GOP is not required. Although it is assumed in FIG. 16 that the number of pictures in a GOP is equal to or more than eleven for the sake of the illustration, the number of pictures in a GOP is not restricted.

Figure 17:
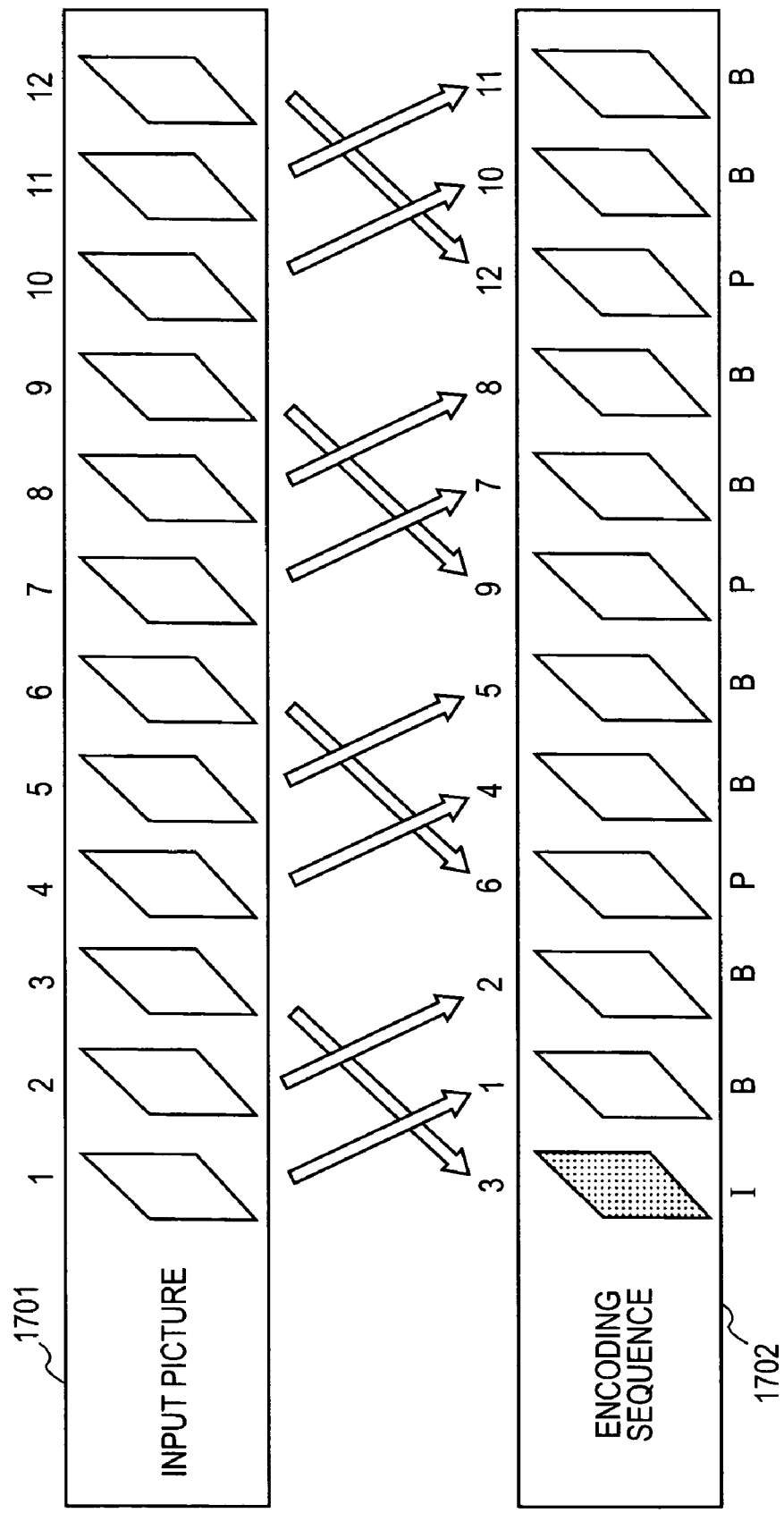

A case will now be described with reference to FIG. 17, in which encoding is performed with three types of pictures, i.e., the I, P, and B pictures. In FIG. 17, a condition is shown, in which the encoding control unit 1103 does not send an instruction for generating a new GOP to the encoding-parameter generating unit 1104. Twelve input pictures 1701 and twelve reordered pictures 1702 are shown in FIG. 17. Picture types I, P, and B are indicated under the corresponding reordered pictures 1702.

In the GOP (the reordered pictures 1702) shown in FIG. 17, any two B pictures are sandwiched between one I picture and one P picture or between two P pictures in order of I, B, B, P, . . . . This arrangement is simplified for the sake of the illustration, and arrangements of pictures are not limited to this arrangement. Picture numbers are indicated above the input pictures 1701 and the reordered pictures 1702. The same picture number is indicated above an input picture 1701 and a reordered picture 1702 that correspond to each other.

It is assumed in FIG. 17 that the number of pictures in a GOP is equal to or more than twelve and only one I picture exists in a case where the encoding control unit 1103 does not issue an instruction for generating a new GOP. When the input pictures 1701 are input in ascending order of picture numbers, as shown by the input pictures 1701 in FIG. 17, the input pictures 1701 are reordered to the reordered pictures 1702 in an encoding process, as shown by arrows between the input pictures 1701 and the reordered pictures 1702, and picture numbers of the reordered pictures 1702 are not sequential, i.e., 3, 1, 2 . . . . In this case, first two B pictures are obtained only by backward prediction.

When bidirectionally predictive inter-frame encoding is performed, an encoding unit 1105 needs to include a buffer that stores as many B pictures as are subjected to encoding. Basically, the B picture is encoded with reference to the I picture or the P picture, which is precedently encoded. Since the B picture requires a picture that is captured after the B picture as a reference image, the order of encoding must be changed, as shown by the reordered pictures 1702, and the reference image must be precedently encoded.

Figure 18:
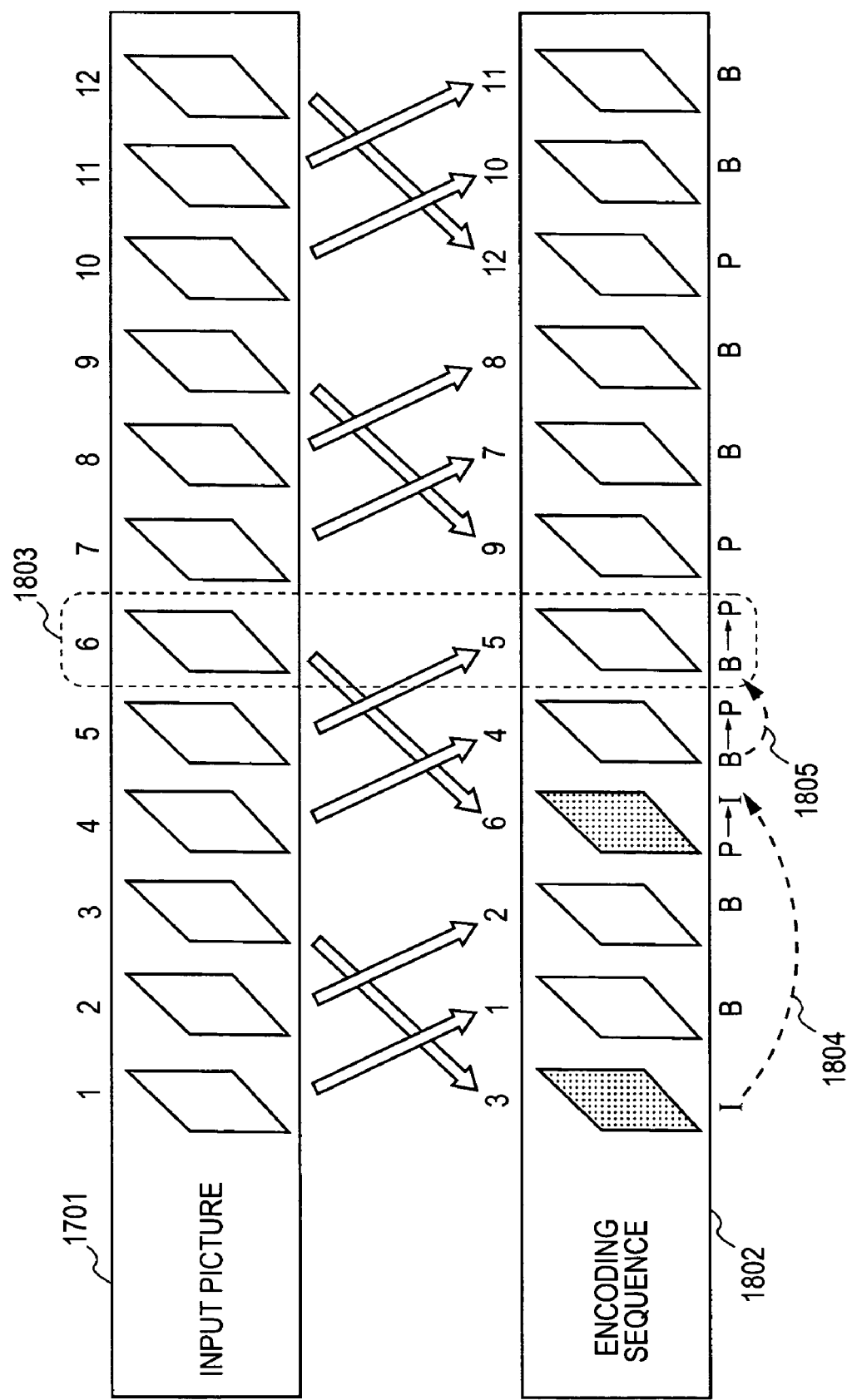
Figure 19:
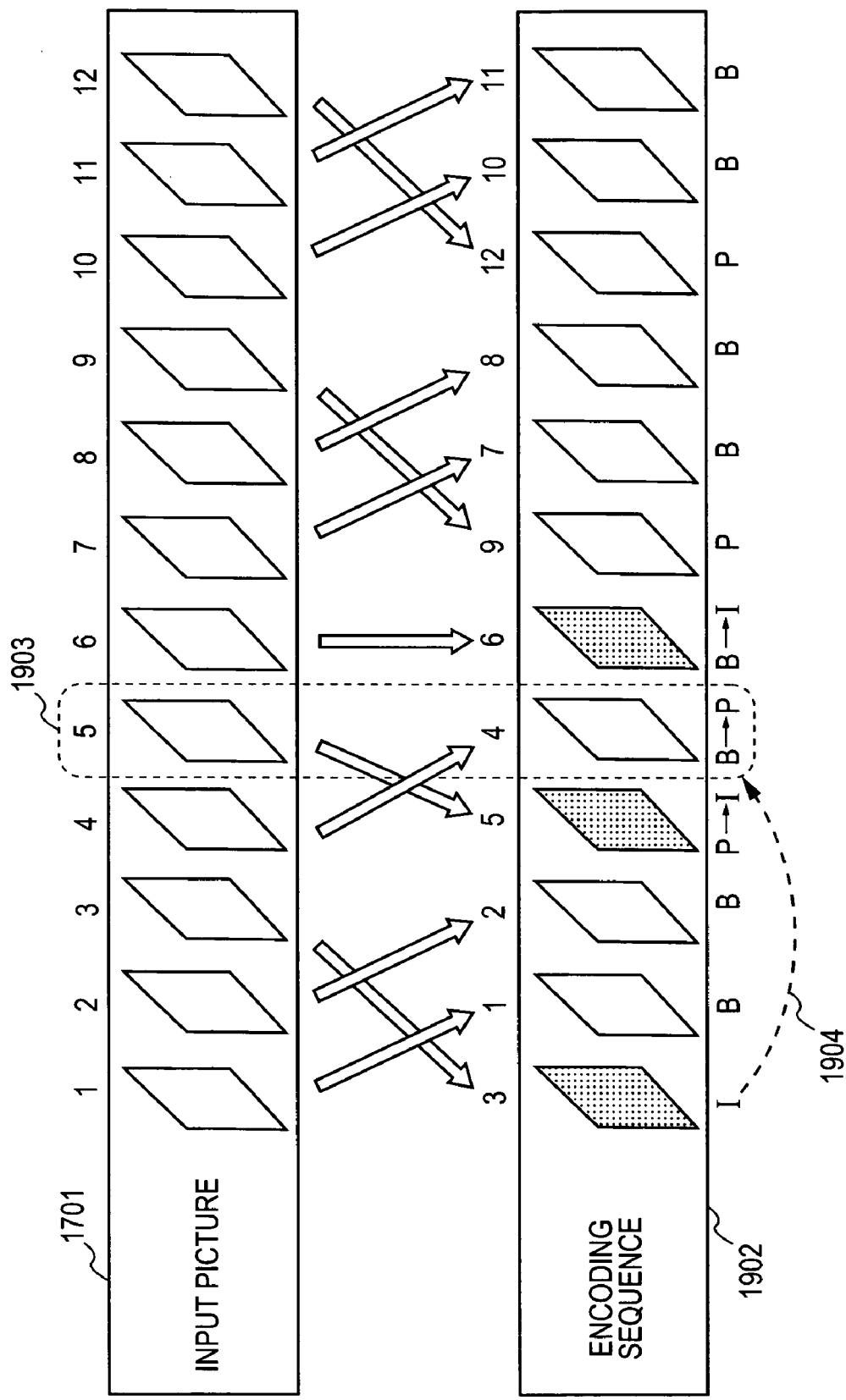
Figure 20:
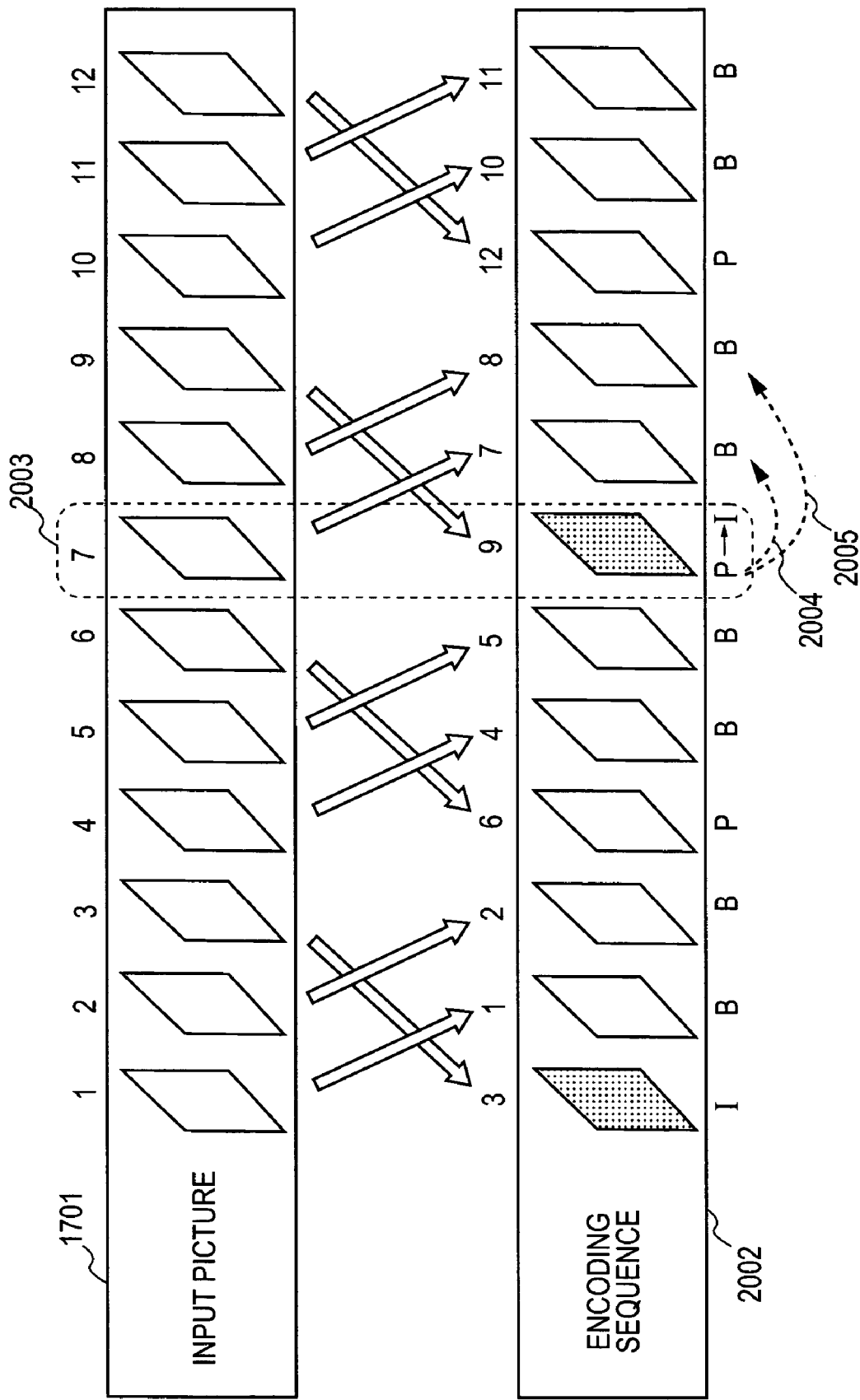

FIGS. 18 to 20 show exemplary structures of GOPs that are different from that of the GOP shown in FIG. 17. These GOPs are generated in a case where the encoding control unit 1103 issues an instruction for generating a new GOP in the middle of encoding.

FIG. 18 shows exemplary structures of GOPs that are generated in a case where the encoding control unit 1103 issues an instruction for generating a new GOP at a frame 1803. The sequence of reordered pictures 1802 shown in FIG. 18 is the same as that of the reordered pictures 1702 shown in FIG. 17. However, individual picture types of the reordered pictures 1802 are different from those of the corresponding reordered pictures 1702. That is to say, an input picture 1701 having picture number 6 at the frame 1803 is encoded as an I picture, and input pictures 1701 having respective picture numbers 4 and 5 that are stored in the buffer as B pictures that refer to a picture in the preceding GOP are encoded as P pictures. The reference image of the input pictures 1701 having respective picture numbers 4 and 5 is not a reordered picture 1802 having picture number 6 but a reordered picture 1802 having picture number 3 that exists in the preceding GOP, as shown by dashed arrows 1804 and 1805. Consequently, the new GOP includes two P pictures that refer to a reference image in the preceding GOP. However, there is no practical problem.

Exemplary structures of GOPs that are different from those shown in FIG. 18 will now be described with reference to FIG. 19. In the case shown in FIG. 18, the encoding control unit 1103 issues the instruction for generating a new GOP in a condition in which the two B pictures, which refer to the I picture in the preceding GOP, are stored in the buffer. On the other hand, in a case shown in FIG. 19, an instruction for generating a new GOP is issued in a condition in which one B picture is stored in the buffer. An input picture 1701 having picture number 5 at a frame 1903 is encoded as an I picture, as in the case shown in FIG. 18. At this time, only one B picture having picture number 4 is stored in the buffer.

The B picture having picture number 4, which was to be encoded as a B picture, is encoded as a P picture. The reference image of the P picture having picture number 4 is not an input picture 1701 having picture number 5 but an I picture having picture number 3 shown by a dashed arrow 1904. An input picture 1701 having picture number 6 is encoded as an I picture and referred to by succeeding pictures. In the case shown in FIG. 19, no picture refers to the first I picture having picture number 5 in the new GOP. The new GOP includes one picture that refers to a reference image in the preceding GOP, as in the case shown in FIG. 18. However, there is no practical problem.

Exemplary structures of GOPs that are different from those shown in FIGS. 18 and 19 will now be described with reference to FIG. 20. In a case shown in FIG. 20, the encoding control unit 1103 issues an instruction for generating a new GOP before a picture in the new GOP that refers to a picture in the preceding GOP is stored in the buffer. The sequence of encoding in FIG. 20 is the same as that in FIG. 17, as shown by input pictures 1701. Input pictures 1701 having respective picture numbers 7 and 8 that were to be encoded as regular B pictures at a frame 2003 are encoded as B pictures only by backward prediction with reference to an image, as shown by dashed arrows 2004 and 2005. An input picture 1701 having picture number 9 that was to be encoded as a P picture is encoded as an I picture. In the case shown in FIG. 20, no picture in the new GOP refers to an image in the preceding GOP.

In the seventh exemplary embodiment, the structure of a GOP is suitably changed in response to the condition when the encoding control unit 1103 issues an instruction for generating a new GOP, as described above. The difference between images having low correlation to each other need not be calculated by adopting the control process shown in the aforementioned cases. Thus, a simple algorithm can be used for allocating a target amount of code, in which only bit rate control for each GOP is performed, thus simplifying the process.

Eighth Exemplary Embodiment

Figure 21:
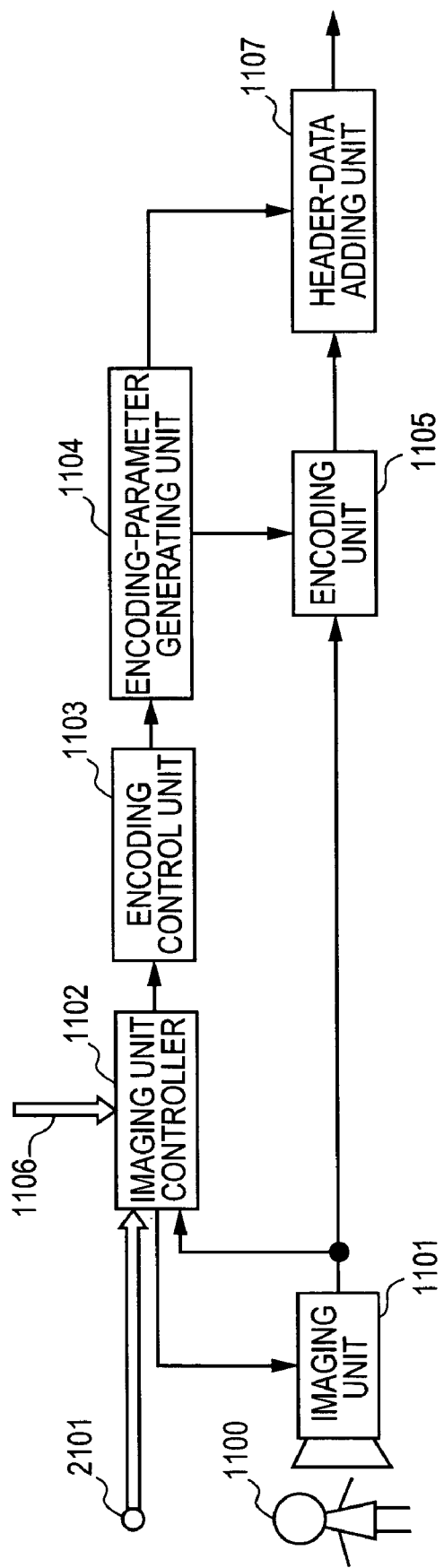
FIG. 21 shows the structure of an exemplary image-encoding apparatus according to an eighth exemplary embodiment.

An exemplary method for controlling an imaging unit 1101 in an image-encoding apparatus according to an eighth exemplary embodiment of the present invention will now be described with reference to FIG. 21. FIG. 21 shows an exemplary structure of the image-encoding apparatus according to the eighth exemplary embodiment. The structure of the image-encoding apparatus according to the eighth exemplary embodiment is substantially the same as that according to the fifth exemplary embodiment shown in FIG. 11, as shown in FIG. 21, and the difference is that an external parameter 2101 is supplied from the exterior of the image-encoding apparatus to an imaging unit controller 1102 in the eighth exemplary embodiment. That is to say, the image-encoding apparatus according to the eighth exemplary embodiment is different in the control of the imaging unit 1101 by the imaging unit controller 1102 from that according to the fifth exemplary embodiment.

In the control and data flow in the image-encoding apparatus according to the eighth exemplary embodiment shown in FIG. 21, the same points as in the fifth exemplary embodiment are not described here. In the eighth exemplary embodiment, the imaging unit controller 1102 controls the imaging unit 1101 on the basis of the external parameter 2101 in addition to moving image data and a user action 1106. The imaging unit controller 1102 monitors the operating condition of the imaging unit 1101 only with moving image data output from the imaging unit 1101. Thus, when the imaging unit 1101 is not in the unsteady condition, the process of encoding is the same as an ordinary process of encoding. However, a stable image is not always obtained when the imaging unit 1101 is not in the unsteady condition. For example, in a case where the image-encoding apparatus is a digital video camera, when the control operation of the imaging unit 1101 is stopped but the image-encoding apparatus is moved by a large amount, processes including inter-frame encoding are performed on images although the images are not stable. To solve such a problem, the imaging unit controller 1102 has a function of controlling the imaging unit 1101 on the basis of data provided by the external parameter 2101 in addition to moving image data and the user action 1106.

Specifically, in order to detect the motion of the image-encoding apparatus (hereinafter referred to as a main body), data from a built-in angular velocity sensor that performs hand movement compensation, a parameter from an auxiliary light metering unit, for example, an automatic focus unit, or the like is used as the external parameter 2101. Thus, the imaging unit controller 1102 can determine whether the main body quickly moves on the basis of the external parameter 2101 and thus can accurately control an encoding process.

As described above, in the image-encoding apparatuses according to the first to eighth exemplary embodiments, not only is the quantization scale controlled on the basis of the condition of encoding, but also the structure of a GOP is changed on the basis of the camera parameter or the like. In this way, allocation of a target amount of code is simplified even though the circuit size of the image-encoding apparatus according to the present invention is substantially the same as that of known image-encoding apparatuses. Thus, the amount of code can be efficiently controlled. Although MPEG-2 is used as the encoding system in the aforementioned exemplary embodiments, the encoding system is limited to MPEG-2, and the present invention can be applied to various types of encoding systems in which intra-frame encoding and inter-frame encoding are performed.

In the first to eighth exemplary embodiments, methods for simplifying bit rate control for individual GOPs are provided, and the type of bit rate control is not restricted. In exemplary bit rate control, for example, an increase in the amount of code is suppressed in the unsteady condition, as described above. Moreover, variable bit rate control is facilitated, in which an unallocated amount of code generated by suppressing an increase in the amount of code in the unsteady condition can be used in the steady condition. Alternatively, the unallocated amount of code may be reserved so that recording time can be longer than normal in a case where a storage unit (for example, a hard disk and a memory) having short recording time is used.

Moreover, in the image-encoding apparatuses according to the first to eighth exemplary embodiments, high speed playback (hereinafter referred to as digest playback) that is faster than normal playback can be performed by playing back only I pictures extracted from generated GOPs. In most digest playbacks in known playback apparatuses, images are extracted at predetermined intervals without consideration of the condition of an image. On the other hand, in the present invention, an effective digest playback that reflects characteristics of moving images can be performed because moving images are played back in units of GOPs that are change points of the shooting condition. Similarly, a desired image can be readily accessed.

In the first to eighth exemplary embodiments, functions of individual processes in the following components (hereinafter referred to as individual processes in specific blocks) may be implemented by a central processing unit (CPU) reading programs that perform functions of the individual components from a memory and executing the programs: the inter-frame correlation calculating unit 101, the scene index value calculating unit 102, the scene-dividing unit 103, the encoding parameter generating unit 104, the encoding unit 105, the decoding unit 107, the encoding distortion calculating unit 108, the imaging control unit 301 or the imaging-control data calculating unit 400, and the scene-division threshold-value calculating unit 700 shown in any one of FIGS. 1, 3, 4, 6, 7, and 9, and the imaging unit controller 1102, the encoding control unit 1103, and the encoding-parameter generating unit 1104 shown in FIGS. 11 and 21.

Moreover, the present is not limited to the aforementioned structure. All or some of the functions of the individual processes in the specific blocks may be implemented by dedicated hardware. The aforementioned memory, from which the CPU reads the programs, may be a hard disk drive, a magneto-optical disk, a nonvolatile memory such as a flash memory, a read-only recording medium such a compact disk-read-only memory (CD-ROM), a nonvolatile memory other than a random access memory (RAM), or a computer-readable/writable recording medium unit including these media.

Moreover, the programs, which perform the functions of the individual processes in the specific blocks, may be recorded on a computer-readable recording medium, and the individual processes may be performed by a computer system reading and executing the recorded programs. In this case, the computer system includes an operating system (OS) and hardware including peripheral devices. Specifically, the programs read from the recording medium may be written to a memory included in, for example, a function expansion board inserted in a computer or a function expansion unit connected to a computer, and then, for example, a central processing unit (CPU) included in the function expansion board, the function expansion unit, or the like may execute some or all of the actual processing to perform the functions according to the aforementioned exemplary embodiments, on the basis of instructions from the programs.

A computer-readable recording medium is a portable medium such as a floppy disk, a magneto-optical disk, a ROM, and a CD-ROM, and a storage unit included in the computer system such as a hard disk. The computer-readable recording medium further includes a RAM included in a computer system that is a server system or a client system. This RAM stores the programs for predetermined time in a case where the programs are transmitted through a network such as the Internet, a communication line such as a telephone line, or the like.

The aforementioned programs may be transmitted from a computer system that stores the programs in a storage unit or the like to other computer systems through a transmission medium or transmission waves in a transmission medium. In this case, the transmission medium, which transmits the programs, is a medium that has a function of transmitting data, for example, a network such as the Internet or a communication line such as a telephone line.

The aforementioned programs may perform some of the aforementioned functions. Moreover, the aforementioned programs may take the form of what is called a difference file (a difference program) that is combined with programs that are already stored in a computer system to perform the aforementioned functions.

Moreover, a program product such as a computer-readable recording medium that stores the aforementioned programs may embody the present invention. The present invention includes the programs, the recording medium, the transmission medium, and the program product, which are described above.

In the image-encoding apparatuses, the image-encoding methods, and the programs according to the first to eighth exemplary embodiments, bit rate control can be efficiently performed by controlling the structure of a GOP on the basis of a control parameter of the imaging unit, output image data, and encoding data.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-330595 filed Nov. 15, 2005, No. 2004-360285 filed Dec. 13, 2004, and No. 2004-360284 filed Dec. 13, 2004, which are hereby incorporated by reference herein in their entirety.

What is claimed is:

1. An image-encoding apparatus to which moving image data and condition data, which is data related to a shooting condition of the moving image data, are input, the image-encoding apparatus comprising:
an encoding unit that performs intra-frame encoding or inter-frame encoding on each picture of the moving image data to output encoded data that includes an encoded group that includes at least one encoded picture;
an encoding distortion calculating unit that calculates an amount of encoding distortion that occurs in an encoding process performed by the encoding unit;
an inter-frame correlation calculating unit that calculates a correlation between frames in the moving image data;
an index value calculating unit that assigns weights, which are changeable in accordance with an instruction from a user, to the correlation output from the inter-frame correlation calculating unit, the condition data, and the amount of encoding distortion calculated by the encoding distortion calculating unit, and calculates an index value that is used for determination for division of the moving image data into encoded groups based on the weighted output correlation, the weighted condition data, and the weighted calculated amount of encoding distortion;
a threshold value determining unit that determines a threshold value based on the correlation output from the inter-frame correlation calculating unit, the condition data, and the amount of encoding distortion calculated by the encoding distortion calculating unit; and
an encoding control unit that outputs a control parameter for controlling at least the structure of the encoded group in the encoding unit based on the index value output from the index value calculating unit;
wherein the encoding control unit outputs the control parameter for controlling the structure of the encoded group in the encoding unit when it is determined by comparing the index value with the threshold value that the index value exceeds the threshold value.

2. The image-encoding apparatus according to claim 1, wherein the encoding distortion calculating unit comprises:
a decoding unit that decodes the encoded data output from the encoding unit and outputs decoded image data; and
a comparing unit that compares the decoded image data output from the decoding unit and the moving image data to calculate the amount of encoding distortion, which occurs in the encoding process.

3. The image-encoding apparatus according to claim 1, further comprising:
an imaging unit that captures an image of a subject and outputs the moving image data; and
an imaging control unit that receives a control instruction for controlling the imaging unit from a user and outputs control data corresponding to the control instruction to the imaging unit and that outputs data related to the control data to the index value calculating unit as the condition data.

4. The image-encoding apparatus according to claim 1, further comprising:
an imaging unit that captures an image of a subject and generates an input image; and
a condition data processing unit that obtains data related to a condition of the imaging unit from the imaging unit and outputs the data to the index value calculating unit as the condition data.

5. The image-encoding apparatus according to claim 4, further comprising:
an imaging control unit that receives a control instruction for controlling the imaging unit from a user and outputs control data corresponding to the control instruction to the imaging unit and that outputs data related to the control data to the index value calculating unit as the condition data.

6. The image-encoding apparatus according to claim 1, wherein the index value calculating unit changes the weights according to changes in the correlation, the condition data, and the amount of encoding distortion or a ratio among the correlation, the condition data, and the amount of encoding distortion.

7. The image-encoding apparatus according to claim 1, wherein the encoding control unit automatically outputs another control parameter for generating a new encoded group upon determining that the number of pictures included in the encoded group, which is being generated by the encoding unit, exceeds a predetermined number of pictures.

8. The image-encoding apparatus according to claim 1, wherein the encoding control unit outputs the control parameter for controlling the structure of the encoded group in the encoding unit when it is determined by comparing the index value with a threshold value that the index value exceeds the threshold value, and decreases the threshold value as the number of pictures included in the encoded group increases.

9. An image-encoding method that uses an image-encoding apparatus to which moving image data and condition data, which is data related to a shooting condition of the moving image data, are input, the image-encoding apparatus including an encoding unit that performs intra-frame encoding or inter-frame encoding on each picture of the moving image data to output encoded data that includes an encoded group that includes at least one encoded picture, the image-encoding method comprising:
an encoding distortion calculating step of calculating an amount of encoding distortion that occurs in an encoding process performed by the encoding unit;
an inter-frame correlation calculating step of calculating a correlation between frames in the moving image data;
an index value calculating step of assigning weights, which are changeable in accordance with an instruction from a user, to the correlation output from the inter-frame correlation calculating step, the condition data, and the amount of encoding distortion calculated by the encoding distortion calculating step, and calculating an index value that is used for determination for division of the moving image data into encoded groups based on the weighted output correlation, the weighted condition data, and the weighted calculated amount of encoding distortion calculated in the encoding distortion calculating step;
a threshold value determining step of determining a threshold value based on the correlation output from the inter-frame correlation calculating step, the condition data, and the amount of encoding distortion calculated by the encoding distortion calculating step; and an encoding control step of outputting a control parameter for controlling at least the structure of the encoded group in the encoding unit based on the index value output from the index value calculating step;

wherein the encoding control step outputs the control parameter for controlling the structure of the encoded group in the encoding unit when it is determined by comparing the index value with the threshold value that the index value exceeds the threshold value.

10. A non-transitory computer readable medium storing a computer program that executes the image-encoding method according to claim 9.

* * * * *